(12) United States Patent
Methvin et al.

(10) Patent No.: US 12,468,583 B2
(45) Date of Patent: Nov. 11, 2025

(54) TECHNIQUES FOR SCALING WORKFLOW CAMPAIGNS

(71) Applicant: Iterable, Inc., San Francisco, CA (US)

(72) Inventors: Gregory Michael Methvin, San Francisco, CA (US); Thomas Kim, San Francisco, CA (US); James Cummings, Windsor, CO (US); Sean Edmund Burke, Whitefish, MT (US); Tse-Wen Tom Wang, Merced, CA (US)

(73) Assignee: Iterable, Inc., San Francisco, CA (US)

( * ) Notice: Subject to any disclaimer, the term of this patent is extended or adjusted under 35 U.S.C. 154(b) by 610 days.

(21) Appl. No.: 17/840,520

(22) Filed: Jun. 14, 2022

(65) Prior Publication Data
US 2022/0398141 A1 Dec. 15, 2022

Related U.S. Application Data

(60) Provisional application No. 63/210,738, filed on Jun. 15, 2021.

(51) Int. Cl.
*G06F 9/54* (2006.01)
*G06F 9/50* (2006.01)

(52) U.S. Cl.
CPC .............. *G06F 9/546* (2013.01); *G06F 9/505* (2013.01); *G06F 9/542* (2013.01)

(58) Field of Classification Search
CPC . G06F 9/46; G06F 9/48; G06F 9/4806; G06F 9/4837; G06F 9/546; H04L 47/50
See application file for complete search history.

(56) References Cited

U.S. PATENT DOCUMENTS

| 10,567,476 B2* | 2/2020 | Patel ..................... H04L 67/10 |
| 10,771,409 B2* | 9/2020 | Jain ........................ H04L 67/55 |
| 2019/0199659 A1 | 6/2019 | Jain et al. |

OTHER PUBLICATIONS

International Search Report for application No. PCT/US2022/072969 dated Sep. 20, 2022.
Canadian Office Action received for Application No. 3223064 dated Jan. 22, 2025, 4 pages.
First Examination Report received from Australian Application No. 2022294976 dated Dec. 6, 2024, 4 pages.
"Amazon Simple Queue Service Developer Guide", Amazon Web Services, Nov. 5, 2012, 109 pages.

* cited by examiner

*Primary Examiner* — Andy Ho
(74) *Attorney, Agent, or Firm* — Squire Patton Boggs LLP; Sarah Mirza

(57) ABSTRACT

Techniques are disclosed for processing a workflow campaign. In some embodiments, a message processing service receives a first message that corresponds to a user arriving at a first node of the workflow campaign from a first message queue. The message processing service causes one or more actions associated with the first node to be performed with respect to the user. In addition, the message processing service determines that the first user should be progressed from the first node to a second node of the workflow campaign. The message processing service generates a second message that corresponds to the user arriving at the second node and determines a second message queue that is associated with the second node. The message processing service progresses the user from the first node to the second node by transmitting the second message to the second message queue.

20 Claims, 7 Drawing Sheets

TECHNIQUES FOR SCALING WORKFLOW CAMPAIGNS

CROSS-REFERENCE TO RELATED APPLICATIONS

This application claims the priority benefit of United States provisional patent application titled, "SCALABLE WORKFLOW CAMPAIGNS AND RELATED STATE MANAGEMENT," filed on Jun. 15, 2021, and having Ser. No. 63/210,738. The subject matter of this related application is hereby incorporated herein by reference.

BACKGROUND

Field of the Various Embodiments

Embodiments of the present disclosure relate generally to computer science and cloud computing, and more specifically, techniques for scaling workflow campaigns.

DESCRIPTION OF THE RELATED ART

Automated message campaigns are used to send electronic messages, such as emails, short message service (SMS) messages, in-application notifications, push notifications, web notifications, and similar items to large numbers of users. A multi-step message campaign involves sending a series of different messages to users. At a given step in the multi-step message campaign, a message is transmitted to a given user if the conditions associated with that given step have been satisfied. For example, a given step could be limited to sending a message only to a user who interacted with a message that was transmitted during a previous step. As another example, a given step could be limited to sending a message to each user after a specified time period of time elapses from when a previous message was transmitted to the user.

Workflow campaigns are programmatic campaigns that define and control the execution of multi-step message campaigns. Each step in the workflow campaign corresponds to an action associated with the multi-step message campaign, such as determining when and/or whether to transmit a message to a user, transmitting a message across a given electronic communication channel, updating user information in response to a user interaction with a message, determining the next step to take with respect to a user, and/or the like, and the conditions, if any, associated with the action. A workflow processing system progresses a user through a workflow campaign by determining a current step within the workflow campaign associated with the user, performing the action specified by that step based on information associated with the user, and associating the user with the next step within the workflow campaign.

Typically, a workflow processing system manages and processes data for a large number of users and for multiple workflow campaigns simultaneously. However, as the amount of processing performed by the workflow processing system increases, conventional workflow processing systems typically experience performance and reliability issues. For example, if a given step in a given workflow campaign requires more processing time relative to other steps in the workflow campaign, then downstream steps within the workflow campaign can be delayed while waiting for the given step to complete. Additionally, upstream steps within the workflow campaign can also be delayed while waiting for processing resources to become available. As the number of users associated with a workflow campaign increases, these types of processing delays can increase exponentially, thereby reducing the overall throughput of the workflow processing system. As another example, the workflow processing system can fail to properly progress a user through a workflow campaign due to an error while processing a given step of the workflow campaign. As a result, the progression of the user through the workflow campaign could stall. Additionally, if the workflow processing system updates information associated with the user to indicate that the user progressed to a subsequent step but failed to properly progress the user to the subsequent step, then the information associated with the user within the workflow processing system becomes inaccurate relative to the actual state of the user. Again, as the number of users increase, the likelihood of these types of errors can increase exponentially, thereby reducing the overall reliability and consistency of the workflow processing system.

As the foregoing illustrates, what is needed in the art are more effective techniques for scaling and processing workflow campaigns.

SUMMARY

In various embodiments, a computer-implemented method for processing a workflow campaign includes receiving, at a message processing service and from a first message queue, a first message that corresponds to a first user arriving at a first node of the workflow campaign. The method further includes causing, by the message processing service, one or more actions associated with the first node of the workflow campaign to be performed with respect to the first user based on the first message. In addition, the method includes determining, by the message processing service, that the first user should be progressed from the first node of the workflow campaign to a second node of the workflow campaign; and in response to determining that the first user should be progressed from the first node of the workflow campaign to the second node of the workflow campaign, generating by the message processing service, a second message that corresponds to the first user arriving at the second node of the workflow campaign. The method also includes determining by the message processing service, a second message queue that is associated with the second node of the workflow campaign; and transmitting by the message processing service, the second message to the second message queue to progress the first user from the first node of the workflow campaign to the second node of the workflow campaign.

One technical advantage of the disclosed techniques relative to the prior art is that the disclosed techniques enable workflow campaign data to be processed with higher throughput and more consistency on a larger scale. In particular, because users within a workflow campaign are processed as messages in a message queue, a workflow processing system can utilize separate message queues to isolate workflow campaigns and/or workflow campaign steps that require longer processing times. Further, by processing messages in a transactional manner, the workflow processing system is able to perform an action for a current step in a workflow campaign and schedule an immediately subsequent step in the workflow campaign correctly for each user associated with the workflow campaign. As a result, the workflow processing system is able to maintain a high processing throughput for different users while ensuring that the state of all processed data remains consistent throughout different parts of the workflow processing system. These technical advantages represent one or more technological improvements over prior art approaches.

BRIEF DESCRIPTION OF THE DRAWINGS

So that the manner in which the above recited features of the various embodiments can be understood in detail, a more particular description of the inventive concepts, briefly summarized above, may be had by reference to various embodiments, some of which are illustrated in the appended drawings. It is to be noted, however, that the appended drawings illustrate only typical embodiments of the inventive concepts and are therefore not to be considered limiting of scope in any way, and that there are other equally effective embodiments.

DETAILED DESCRIPTION

In the following description, numerous specific details are set forth to provide a more thorough understanding of the various embodiments. However, it will be apparent to one skilled in the art that the inventive concepts may be practiced without one or more of these specific details.

Workflow Campaign Overview

A workflow campaign is a programmatic campaign that defines and controls the execution of a multi-step message campaign. Each step in the workflow campaign corresponds to an action associated with the multi-step message campaign, such as transmitting a message to a user across one or more electronic communication channels, updating user information in response to a user interaction with a message, filtering a user based on a condition, selecting a path in the workflow campaign for a user, suspending or delaying processing of a user for a specified period of time, and/or the like. When a user enters a workflow campaign, the user proceeds from each step of the workflow campaign to the next until the user reaches the end of the workflow campaign.

Figure 1:
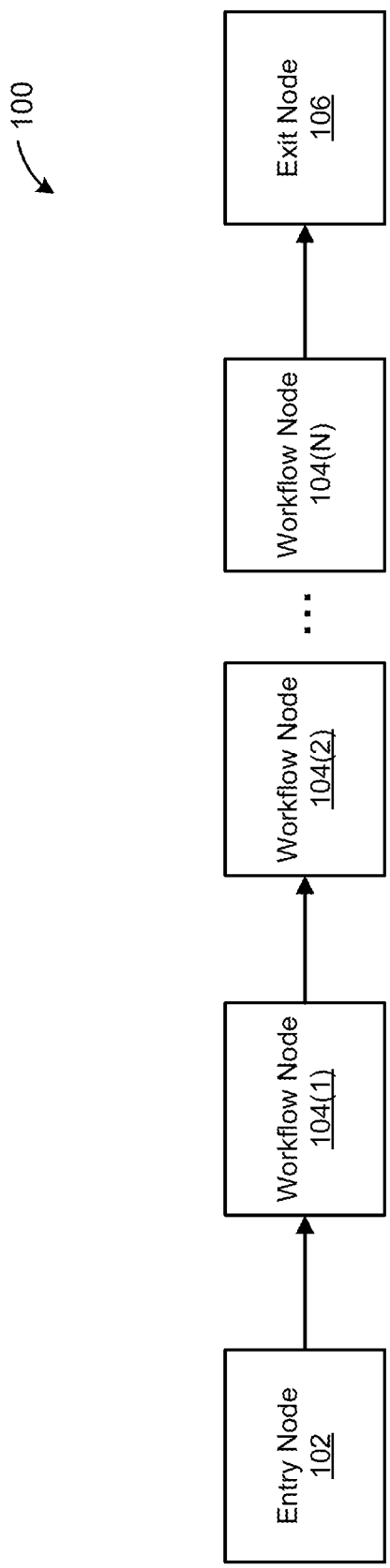
FIG. 1 is a block diagram illustrating an exemplar workflow campaign, according to various embodiments.

FIG. 1 is a block diagram illustrating an exemplar workflow campaign 100, according to various embodiments. As shown in FIG. 1, workflow campaign 100 includes an entry node 102, a plurality of workflow nodes 104(1)-(N), and an exit node 106. Each of entry node 102, the plurality of workflow nodes 104, and exit node 106 corresponds to a different step in workflow campaign 100.

Entry node 102 corresponds to an entry point for workflow campaign 100. A user enters the workflow campaign 100 at entry node 102. In some embodiments, entry node 102 is associated with one or more specified methods for entering workflow campaign 100. For example, entry node 102 could specify that workflow campaign 100 should be executed weekly at a specified time for users included in a given mailing list. At the specified time, each user included in the mailing list is entered into workflow campaign 100. As another example, entry node 102 could be associated with a specified message. Each user that interacts with the specified message enters into workflow campaign 100. In various embodiments, any suitable method can be used to enter a user into a workflow campaign, such as a scheduled event, a call to a workflow campaign application programming interface (API), an action associated with a node of another workflow campaign, a change in user information associated with the user, and/or in response to a user action. A user action could be, for example and without limitation, the user interacting with an element on a web site or application, downloading a file, viewing a file, making a purchase, adding an item to a shopping cart, subscribing to a mailing list, unsubscribing from a mailing list, subscribing to an electronic communication channel, unsubscribing from an electronic communication channel, opening or viewing an electronic message (e.g., email, text message, push notification, in-application message), and/or the like.

In some embodiments, entry node 102 is associated with one or more entry actions. When a user arrives at entry node 102, the one or more entry actions associated with entry node 102 are performed with respect to the user.

In some embodiments, the one or more entry actions include generating workflow state data for a user. The workflow state data indicates that the user has entered the workflow campaign 100. Additionally, the workflow state data can include information associated with the user and the entry of the user into workflow campaign 100. For example, the workflow state data could indicate a user identifier associated with the user, the method by which the user entered workflow campaign 100, additional metadata associated with the method by which the user entered workflow campaign 100 (e.g., a payload associated with a message), an entity that owns or manages the workflow campaign 100, a project associated with the workflow campaign 100, and/or the like. As a user progresses through the subsequent nodes of workflow campaign 100, such as workflow nodes 104(1)-(N) and exit node 106, the workflow state data associated with the user is updated to indicate the current node of workflow campaign 100 at which the user is located.

In various embodiments, the workflow state data for a plurality of users can be used to track the number of users that have entered workflow campaign 100 and the number of users at each node of workflow campaign 100. Additionally, the workflow state data for a given user can be used to determine whether the given user had previously entered workflow campaign 100 and/or if the given user is currently in workflow campaign 100.

In some embodiments, entry node 102 includes one or more entry rules for workflow campaign 100. The one or more entry actions include evaluating the one or more entry rules with respect to the user. When a user arrives at entry node 102, the user is evaluated to determine whether the user satisfies the one or more entry rules. If the user satisfies the one or more entry rules, then the user can progress to the next node(s) in workflow campaign 100. If the user does not satisfy the one or more entry rules, then the user is not progressed to the next node(s) in workflow campaign 100.

That is, users that satisfy the entry rules associated with are entered into workflow campaign 100 and users that do not satisfy the entry rules are not entered into workflow campaign 100. In some embodiments, if the user does not satisfy the one or more entry rules, then workflow state data is not generated for the user. In some embodiments, if the user does not satisfy the one or more entry rules, then workflow state data is generated that indicates that the user arrived at entry node 102 but was not entered into workflow campaign 100.

In some embodiments, an entry rule specifies one or more criteria associated with the user. The entry rule could specify that a user should be entered into workflow campaign 100 if the user meets all of the specified criteria, none of the specified criteria, more than a threshold number of the specified criteria, or less than a threshold number of the specified criteria. A criteria can be based on any suitable attributes associated with the user or actions performed by the user, such as whether the user is included in a specified list of users, whether the user profile information for the user contains a specified field, whether a given field in the user profile information has a value or is empty, whether the value in a given field satisfies a specified criteria, whether the user interacted with a specified message, whether the number of times a user interacted with a specified message meets a specified criteria, whether the user interacted with one or more messages from a specified communication channel, whether the number of times a user interacted with messages from a specified communication channel meets a specified criteria, whether the user added one or more items to a cart, whether the user purchased one or more items, whether the user added items to a cart but has not checked out, and/or the like. Processing a user at entry node 102 includes retrieving or requesting information associated with the user, such as user profile information or user event information, in order to determine whether the user meets the one or more criteria specified by each entry rule.

In some embodiments, an entry rule specifies a lifetime entry limit associated with the workflow campaign 100. The lifetime entry limit specifies a maximum number of times that any given user can enter the workflow campaign 100. The maximum number of times can be any suitable number, including one (i.e., each user can only enter workflow campaign 100 a single time) and unlimited (i.e., no lifetime entry limit). Processing a user at entry node 102 includes determining a number of times that the user has entered workflow campaign 100 and determining whether the number of times is below the maximum number.

In some embodiments, an entry rule specifies a simultaneous entry limit associated with the workflow campaign 100. The simultaneous entry limit specifies a maximum number of times that users can concurrently be in workflow campaign 100. The maximum number of times can be any suitable number, including one (i.e., a user has to exit workflow campaign 100 before the user can be entered into workflow campaign 100 again) and unlimited (i.e., a user can be added to workflow campaign 100 any number of times even if the user has not yet exited workflow campaign 100). Processing a user at entry node 102 includes whether the user is currently in workflow campaign 100 and/or how many instances of the user are currently in workflow campaign 100.

Figure 2:
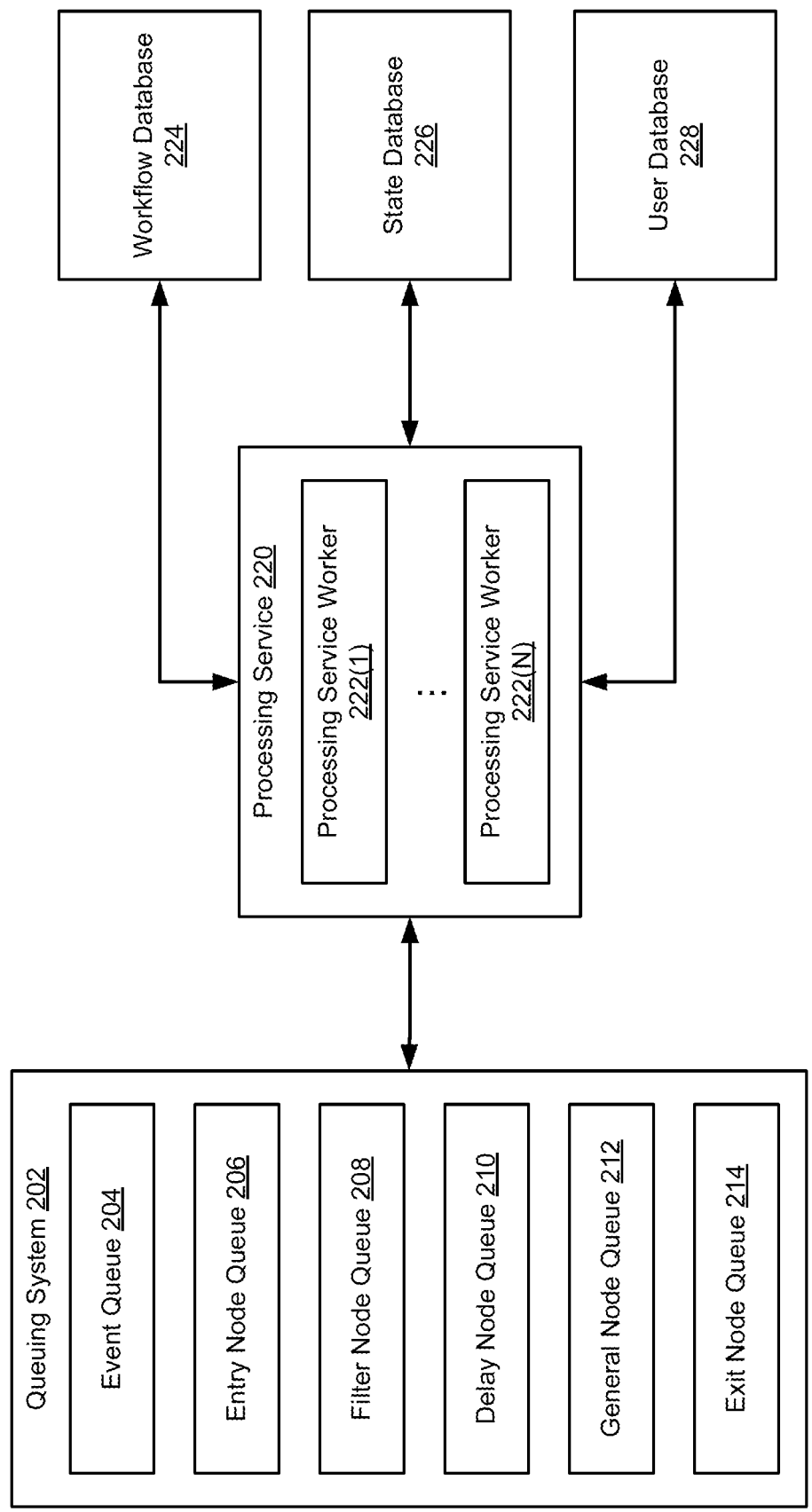
FIG. 2 is a block diagram illustrating a workflow campaign system configured to implement one or more aspects of the various embodiments.

In some embodiments, after the one or more entry actions associated with entry node 102 are performed, then the user progresses to the next node in workflow campaign 100. As shown in FIG. 2, entry node 102 is succeeded by a workflow node 104(1). The entry actions associated with entry node 102 are performed for each user, and then the user leaves entry node 102 and enters workflow node 104(1). If the user does not satisfy the entry rules associated with entry node 102, then the user does not move to workflow node 104(1).

In some embodiments, each workflow node 104 is associated with one or more workflow campaign actions. A workflow campaign action can be, for example, sending a message across one or more communication channels (e.g., email, text message, push notification, web notification, and/or in-application notification), delaying a user for a specified amount of time or until a specified time, filtering a user based on one or more conditions, selecting a subsequent workflow node based on one or more conditions (e.g., performing an A/B split, yes/no split, or attribute split), sending a user to a different workflow campaign, updating user information associated with the user (e.g., user profile fields or subscription preferences), adding the user to a list, removing the user from a list, and/or the like.

When a user enters the workflow node 104, the one or more workflow campaign actions are performed with respect to the user. After the one or more workflow campaign actions are performed, the user progresses to the next node in the workflow campaign 100, if any. If the one or more workflow campaign actions performed at the workflow node 104 included filtering the user based on one or more conditions, the user may not progress to the next node if the user did not satisfy the one or more conditions. If the one or more workflow campaign actions performed at the workflow node 104 included selecting a subsequent workflow node from two or more subsequent nodes (e.g., if the workflow campaign branches at the workflow node 104) the user progresses to the selected node.

As shown in FIG. 1, when a user arrives at workflow node 104(1), the one or more workflow campaign actions associated with workflow node 104(1) are performed. Subsequently, the user leaves workflow node 104(1) and enters workflow node 104(2). After the user enters workflow node 104(2), one or more workflow actions associated with workflow node 104(2) are performed with respect to the user, and the user is then progressed to workflow node 104(3). In some embodiments, when a user arrives at each node of workflow campaign 100, the workflow state data associated with the user is updated to indicate that the user has left the previous node and has arrived as the current node. The user progresses through each workflow node 104 until the user leaves workflow node 104(N) and enters exit node 106.

Exit node 106 corresponds to an exit point for workflow campaign 100. A user leaves the workflow campaign 100 at exit node 106. In some embodiments, exit node 106 is associated with one or more exit actions. When a user arrives at exit node 106, the one or more exit actions associated with exit node 106 are performed with respect to the user. In some embodiments, exit node 106 is associated with one or more workflow actions in addition to the one or more exit actions. When a user arrives at exit node 106, the one or more workflow actions are performed with respect to the user. After the one or more workflow actions are performed, the one or more exit actions are performed.

In some embodiments, the one or more exit actions include deleting or removing the workflow state data associated with the user. In some embodiments, the one or more exit actions includes generating and storing exit data that indicates that the user exited the workflow campaign 100. The exit data could indicate, for example, a time at which the user entered the workflow campaign 100, a time at which the user exited the workflow campaign 100, an amount of time taken for the user to progress through the workflow campaign 100, the method by which the user entered workflow campaign 100, the additional metadata associated with the method by which the user entered workflow campaign 100, the entity that owns or manages the workflow campaign 100, the project associated with the workflow campaign 100, and/or the like. In some embodiments, generating the exit data includes updating the workflow state data for the user, e.g., to include an exit time associated with the user. Additionally, in some embodiments, to store the exit data, the updated workflow state data is removed from a data storage associated with workflow state data and stored to a data storage associated with historical user workflow data. The workflow state data and/or exit data can be used to determine whether a user is currently in workflow campaign 100, for example whether a set of exit data includes data indicating that the user left the workflow campaign 100 or whether a set of workflow state data includes workflow state data associated with the user.

Although FIG. 1 illustrates a workflow campaign 100 that has a single entry node 102, N number of workflow nodes 104, and a single exit node 106, a workflow campaign can have any number of entry nodes, workflow nodes, and/or exit nodes, including zero or one. For example, a user can enter a workflow campaign via any number of methods. Each method could correspond to a different entry node of the workflow campaign. As another example, a workflow campaign could include a number of branching paths that each end in a different exit node. Additionally, a workflow node that includes a filtering action could also be an exit node with respect to users that do not satisfy the filter corresponding to the workflow node. Accordingly, although FIG. 1 illustrates a linear workflow campaign 100, a given workflow campaign 100 can be a directed acyclic graph (DAG) having any suitable number of nodes and edges.

As shown in FIG. 1, when a user enters a workflow campaign 100, one or more actions are performed for the user for each node of the workflow campaign 100. As a result, as the number of users that enter workflow campaign 100 and/or the number of nodes included in workflow campaign 100 increase, the amount of data processing and the number of actions that are performed for the workflow campaign 100 also increases. However, as described above, if a system that is processing workflow campaigns cannot properly scale with the number of users, then any errors or processing delays caused by the system will increase as the number of users increase. For example, if a given node of workflow campaign 100 requires more processing time compared to other nodes of workflow campaign 100, then processing of subsequent nodes will be delayed while waiting for processing of the given node to complete. Additionally, if processing of other users is waiting on processing of a given user through the workflow campaign 100 or through the given node of workflow campaign 100 to complete (e.g., due to system processing constraints), then processing of the other users are also delayed as a result of processing the given node. As the number of users increase, the delays caused by the given node are further increased.

System Overview

FIG. 2 is a block diagram illustrating a workflow campaign system 200 that is configured to implement one or more aspects of the various embodiments.

Workflow campaign system 200 manages a plurality of workflow campaigns, such as workflow campaign 100, and processing users through the plurality of workflow campaigns. In some embodiments, workflow campaign system 200 is configured to process an event (e.g., API call, user action, change in user information, scheduled event) and identify one or more workflow campaigns included in the plurality of workflow campaigns that a user associated with the event should be entered into. Workflow campaign system 200 enters the user into each identified workflow campaign and progresses the user through the workflow campaign. Additionally, in some embodiments, workflow campaign system 200 manages and tracks the progress of users through each workflow campaign included in the plurality of workflow campaigns. For example, workflow campaign system 200 could generate and store data that indicates, for each user, one or more workflow campaigns that the user has entered and/or one or more nodes that the user is currently at within each workflow campaign.

As shown in FIG. 2, workflow campaign system 200 includes queueing system 202, processing service 220, workflow database 224, state database 226, and user database 228. As discussed in further detail below, workflow campaign system 200 progresses a user through a workflow campaign by enqueueing a message corresponding to the user arriving at a node in the workflow campaign in queueing system 202, dequeuing and processing the message using processing service 220, and enqueueing another message corresponding to the user arriving at a next node in the workflow campaign in queueing system 202.

Workflow database 224 that stores workflow data for the plurality of workflow campaigns managed by workflow campaign system 200. Workflow data associated with a given workflow campaign can include, for example, an identifier corresponding to the workflow campaign, entry method(s) for the workflow campaign, a project associated with the workflow campaign, an entity to which the workflow campaign belongs, one or more tags or labels associated with the workflow campaign, and/or the like. Additionally, workflow data associated with a given workflow campaign can include, for each node of the workflow campaign, an identifier corresponding to the node and one or more actions associated with the node. For each action, the workflow data can define the action and specify one or more rules, criteria, and/or other information used to perform the action. Processing service 220 uses the workflow data stored in workflow database 224 to identify workflow campaigns that are triggered by an event, determine which workflow campaigns and/or which workflow campaign nodes correspond to a message, which actions are associated with a given workflow campaign node, and/or the like.

State database 226 stores workflow state data for the plurality of workflow campaigns. For a given user and a given workflow campaign that the user has entered, the workflow state data indicates the progress of the user in the workflow campaign. Additionally, the workflow state data corresponds to a particular instance of the given user within the given workflow campaign. That is, the workflow state data corresponds to a specific event that caused the user to enter the workflow campaign. Therefore, state database 226 can include workflow state data corresponding to multiple instances of the same user within the same workflow campaign. However, each instance of the user within the workflow campaign was triggered by a different event. In some embodiments, state database 226 stores only workflow state data for users that are currently in a workflow campaign. After a user exits a workflow campaign, the corresponding workflow state data is removed from state database 226. In other embodiments, after the user exits the workflow campaign, the corresponding workflow state data is updated to indicate that the user exited the workflow campaign, and the workflow state data is not removed from state database 226.

User database 228 stores user profile data for a plurality of users associated with workflow campaign system 200. The user profile data can include any number or type of information associated with a user, such as an identifier associated with the user, email address, phone number, signup source, signup date, profile modification date, subscribed mailing lists, subscribed communication channels, and/or the like. In some embodiments, the user profile data also includes one or more actions that the user as performed, such as interacting with a message, actions taken in mobile application, actions taken on a website, and/or the like. User database 228 can include user profile data for users that are not currently in any workflow campaigns and/or users that have not previously entered any workflow campaigns.

In some embodiments, workflow campaign system 200 includes additional services or other elements (not shown) for performing various actions associated with workflow campaigns, such as a message sending service for scheduling and sending messages to users or an ingestion service for updating user profile information for users. In some embodiments, workflow campaign system 200 transmits requests to other systems that perform the various actions, such as a separate system that is configured to send messages or manage user profile information.

Queueing system 202 includes a plurality of queues. When an event that triggers entry into one or more workflow campaigns occurs, the event is added to a queue in queueing system 202 for processing. Similarly, when a user arrives at a node in a workflow campaign, the user is added to a queue in queueing system 202 for further processing. Subsequently, processing service 220 dequeues an event or a user from queueing system 202 and performs one or more actions or processing operations associated with the dequeued event or the user.

In some embodiments, each queue included in queueing system 202 is a message queue storing a plurality of messages. Each message corresponds to a user within a workflow campaign or an event that triggers entry of a user into a workflow campaign, and represents a task to perform with respect to the user, such as performing actions associated with a given node of the workflow campaign or entering the user into the workflow campaign based on an event.

In some embodiments, a message corresponding to an event includes data associated with the event, such as an identifier corresponding to a user that triggered the event or a user associated with the event, an event type of the event, an event payload associated with the event, and/or the like. The event payload could include any number or type of information associated with the event, such as tags, labels, a source of the event (e.g., a specific message that the user interacted with, a specific file that the user downloaded), a project associated with the event, and/or other information that can be used to filter and/or categorize the event.

In some embodiments, a message corresponding to a user within a workflow campaign includes data associated with the presence of the user within the workflow, such as a user identifier corresponding to the user, a visitor identifier corresponding to the specific instance of the user within the workflow campaign (e.g., to distinguish between multiple instances of the same user within the same workflow campaign), a workflow campaign identifier corresponding to the workflow campaign, a workflow node identifier corresponding to the workflow node at which the user is located, and/or the like. Additionally, a message corresponding to the user within a workflow campaign includes event data associated with the event that caused the user to be entered into the workflow campaign.

In some embodiments, the queueing system 202 implements a publish-subscribe pattern that permits other elements of workflow campaign system 200, such as processing service workers 222(1)-(N), to publish messages to the plurality of queues included in the queueing system 202 and to subscribe to receive messages stored in the plurality of queues. For example, in some embodiments, the queueing system 202 is an Apache Pulsar messaging platform, which allows producers to publish messages to topics that consumers can subscribe to. Each topic in the Apache Pulsar messaging platform corresponds to a queue included in queueing system 202, and a message is enqueued in a queue by publishing the message to the corresponding topic and dequeued by delivering the message to a subscribed consumer.

In some embodiments, each queue included in queueing system 202 corresponds to a different type of action or processing operation associated with a workflow campaign. As shown in FIG. 2, queueing system 202 includes event queue 204, entry node queue 206, filter node queue 208, delay node queue 210, general node queue 212, and exit node queue 214. Event queue 204 stores messages corresponding to events, such as API calls, user actions, changes to user profile information, changes to user subscription information, scheduled events, and/or the like. Entry node queue 206 stores messages corresponding to workflow campaign entry nodes, such as entry node 102. Filter node queue 208 stores messages corresponding to workflow nodes that are associated with actions that filter users, such as performing an A/B split, yes/no split, or attribute split. Delay node queue 210 stores messages corresponding to workflow nodes that delay processing of a user, such as messages that delay a user for a specified amount of time or until a specified time. General node queue 212 stores messages corresponding to workflow nodes that do not include any specialized processing, such as sending a message or updating user profile information. Exit node queue 214 stores messages corresponding to workflow campaign terminal or exit nodes, such as exit node 106.

In various embodiments, queueing system 202 can include more or fewer queues than those illustrated in FIG. 2, and/or can include queues that correspond to different types of actions than those discussed above. For example, in some embodiments, queueing system 202 can include queues of a higher level of granularity, such as a single workflow node queue that corresponds to any type of workflow node 104. As another example, in some embodiments, queueing system 202 can include queues of a lower level of granularity, such as queues that correspond to specific workflow campaign actions (e.g., a general node queue 212 for nodes associated with sending messages and a general node queue 212 for nodes associated with updating user profile information), queues that correspond to specific events (e.g., a different event queue 204 for each type of user action), queues that correspond to specific delay times (e.g., a different delay node 210 for one minute delays, five minute delays, and sixty minute delays), and/or the like.

In some embodiments, queueing system 202 includes, for each workflow campaign managed by workflow campaign system 200, a set of queues associated with the workflow campaign. For example, queueing system 202 could include one or more event queues 204 associated with a first workflow campaign, one or more event queues 204 associated with a second workflow campaign, and so on. The number of queues of each type and/or the types of queues can vary depending on the workflow campaign. For example, if a given workflow campaign does not include any filter nodes, then the given workflow campaign is not associated with a filter node queue 208. As another example, if a given workflow campaign includes a large number of nodes of a given type (e.g., message sending nodes) then queues could be associated with the nodes of the workflow campaign at a lower level of granularity, such as associating a different queue with each communication channel or associating a different queue with each node of the workflow campaign.

In some embodiments, queueing system 202 includes, for each set of one or more workflow campaigns, a set of queues associated with the set of workflow campaigns. Any suitable method can be used to divide a plurality of workflow campaigns into different sets, such as based on the entity to which each workflow campaign belongs, the project with which each workflow campaign is associated, a tag or label associated with each workflow campaign, and/or the like. For example, in some embodiments, workflow campaign system 200 manages workflow campaigns that belong to a number of different entities (e.g., different customers of a message campaign service provider). Queueing system 202 includes, for each entity, a set of queues associated with workflow campaigns that belong to the entity. As another example, in some embodiments, each workflow campaign is associated with a project. Queueing system 202 could include, for each project, a set of queues associated with workflow campaigns that are associated with the project.

In some embodiments, the number of queues included in queueing system 202 can vary based on the workload (e.g., number of users and/or amount of processing time for each user) associated with each workflow campaign. For example, a workflow campaign that receives a large number of users within a given period of time could be associated with its own set of queues, while multiple workflow campaigns that each receive a small number of users within the given period of time could be associated with the same set of queues. Additionally, in some embodiments, the queues associated with a workflow campaign or set of workflow campaigns can be modified if the workload associated with the workflow campaign and/or set of workflow campaigns changes. For example, if the same set of queues is associated with a set of workflow campaigns and the workload corresponding to a given workflow campaign increases, then a separate set of queues could be created and associated with the given workflow campaign. Determining whether to adjust the queues associated with a workflow campaign or a set of workflow campaigns can be based on, for example, the number of users that enter each workflow campaign during a given period of time, the rate at which users enter each workflow campaign, the amount of processing time associated with each workflow campaign, the amount of processing time associated with different nodes of each workflow campaign, the amount of users associated with each set of workflow campaigns, the amount of processing time associated with each set of workflow campaigns, and/or the like. For example, a given workflow campaign could be associated with a separate set of queues if the number of users that enter the workflow campaign per minute exceeds a threshold amount.

Any suitable techniques can be used to associate a workflow campaign and/or a workflow campaign with a given queue. In some embodiments, queueing system 202 includes a mapping that maps each queue to one or more workflow campaigns and/or one or more workflow campaign nodes. For example, the mapping could indicate, for each queue, the workflow campaign identifiers and/or workflow campaign node identifiers associated with the queue. In some embodiments, each queue is associated with a queue identifier that indicates the one or more workflow campaigns and/or one or more workflow campaign nodes that are associated with the queue. For example, in embodiments where the queueing system 202 is an Apache Pulsar messaging platform, the name of each topic could follow a naming convention that includes one or more of an entity name, a project name, an action type, a workflow node type, a workflow campaign identifier, a workflow campaign node identifier, and/or the like in a pre-determined order.

One benefit of the above approach is that the number of queues included in queueing system 202 can be increased (or decreased) on demand. Because workflow campaigns that have larger workloads can have separate queues from workflow campaigns that have smaller workloads, processing messages associated with a workflow campaign that has fewer users (i.e., that are associated with fewer messages) is not affected or delayed as a result of processing messages for other workflow campaigns that have a large number of users (i.e., that are associated with a large number of messages). Similarly, for a given workflow campaign, because different nodes can be associated with different queues, when a node requires longer processing times, processing messages associated with the node is less likely to affect or delay processing of messages associated with other nodes in the workflow campaign.

Additionally, in embodiments where the queueing system 202 includes an Apache Pulsar messaging platform, a new topic (corresponding to a queue) can be created by generating a topic name based on the workflow campaign(s) and/or workflow campaign node(s) to be associated with the new topic and specifying the topic name when publishing a message. When queueing system 202 receives the message, queueing system 202 determines that a topic with the specified topic name does not exist and automatically creates the new topic. Accordingly, using an Apache Pulsar messaging platform, queueing system 202 can be easily scaled by increasing the number of topics (queues) included in queueing system 202.

Furthermore, the Apache Pulsar messaging platform stores and organizes data in a persistent, distributed storage system. Typical queueing systems store queue data in memory, which does cannot be easily expanded as the number of queues or the number of messages in each queue increases. In contrast, storing and organizing messages in a persistent, distributed storage enables queueing system 202 to easily expand storage capacity by adding additional nodes (Apache Bookkeeper bookies). As a result, queueing system 202 can reliably scale both by increasing the number of queues and by increasing the amount of storage available for storing the data contained in the queues.

Processing service 220 dequeues messages enqueued in queueing system 202 and processes the dequeued messages. Processing a dequeued message includes determining one or more actions associated with the dequeued message. Processing service 220 performs the one or more actions associated with the dequeued message, sends a request to one or more other services to perform the one or more actions, or a combination thereof.

If a dequeued message corresponds to an event, the one or more actions associated with the dequeued message include determining one or more workflow campaigns that are triggered by the event and entering a user associated with the event into the one or more workflow campaigns. In some embodiments, determining the one or more workflow campaigns is based on the event data included in the message. For example, the event data included in the message could be compared to the method(s) of entry specified for each workflow campaign to determine which workflow campaigns can be entered from the event. Additionally, the event data could be compared to each workflow campaign to identify workflow campaigns that are associated with a same entity, project, tags, labels, and/or the like as the event. In some embodiments, processing service 220 queries a workflow database 224 that stores workflow data for a plurality of workflow campaigns managed by workflow campaign system 200 for workflow campaigns whose method(s) of entry match the event data.

In some embodiments, determining the one or more workflow campaigns is based on the queue from which a message is dequeued. For example, if a message is dequeued from a queue that is associated with a particular workflow campaign, then processing service 220 could determine that the event triggers the particular workflow campaign. As another example, if a message is dequeued from a queue that is associated with a particular entity to which a set of workflow campaigns belong, then processing service 220 could compare the event data with only the set of workflow campaigns that belong to the particular entity to determine whether the event triggers any workflow campaigns.

After identifying one or more workflow campaigns that the user should be entered into, processing service 220 enters the user into each identified workflow campaign. In some embodiments, entering a user into a workflow campaign includes generating a message that associates the user with the workflow campaign, and enqueueing the message in an entry node queue 206 associated with the workflow campaign.

In some embodiments, the generated message associates the user with the workflow campaign, for example, by including an identifier associated with the user and an identifier associated with the workflow campaign. In some embodiments, processing service 220 generates a visitor identifier that is associated with the current instance of the user entering the workflow campaign. The visitor identifier distinguishes the current instance of the user entering the workflow campaign from other instances in which the user entered the workflow campaign. Processing service 220 includes the visitor identifier in the generated message. In some embodiments, processing service 220 includes an identifier associated with the entry node of the workflow campaign in the generated message. If the workflow campaign includes multiple entry nodes, the identifier indicates the specific entry node whose method of entry is met by the event. The entry node identifier and the user identifier (or visitor identifier), in conjunction with one another, associates the user with the entry node of the workflow campaign. Additionally, in some embodiments, processing service 220 includes the data from the dequeued message, such as event data, in the generated message.

In some embodiments, enqueueing the generated message in an entry node queue 206 includes determining the particular entry node queue 206 that is associated with the workflow campaign and/or the entry node of the workflow campaign. For example, if queueing service 202 includes multiple entry node queues 206, where each entry node queue 206 is associated with one or more specific workflow campaigns, then processing service 220 determines the specific entry node queue 206 that is associated with the workflow campaign that the user is being entered into. In some embodiments, processing service 220 determines the specific entry node queue 206 based on a mapping that maps the specific entry node queue 206 to the workflow campaign and/or the workflow campaign node. In some embodiments, the queues included in queueing system 202 are associated with identifiers that follow a pre-determined naming convention. In such embodiments, instead of determining a specific entry node queue 206, processing service 220 generates a queue identifier associated with the entry node queue 206 based on the naming convention. For example, if the naming convention specifies that the queue identifier for each entry node queue 206 includes a project name followed by the node type (i.e., entry node), then processing service 220 generates a queue identifier based on the project name associated with the workflow campaign. Processing service 220 publishes the message to the queue having the generated queue identifier.

If a message corresponds to a node of a workflow campaign, then the one or more actions associated with the dequeued message include the one or more actions associated with the node. For example, if the node is an entry node 102, then processing service 220 determines one or more entry actions associated with the entry node 102. If the node is a workflow node 104, then processing service 220 determines one or more workflow campaign actions associated with the workflow node 104. If the node is an exit node 106, then processing service 220 determines one or more exit actions associated with the exit node 106.

In some embodiments, determining the one or more actions associated with a workflow campaign node includes determining which workflow campaign is associated with the message. For example, if the message includes a workflow campaign identifier, the processing service 220 queries workflow database 224 for the workflow campaign associated with the workflow campaign identifier. As another example, if the message was dequeued from a queue associated with a particular workflow campaign, then processing service 220 determines that the message is associated with the particular workflow campaign.

In some embodiments, determining the one or more actions associated with a workflow campaign node includes determining which workflow campaign node is associated with the message. For example, if the message includes a workflow campaign node identifier, the processing service 220 could query workflow database 224 for the workflow campaign node associated with the workflow campaign node identifier. As another example, if the message includes a visitor identifier, the processing service 220 could query a state database 226 that stores workflow state data for different users to obtain workflow state data that is associated with the visitor identifier. The workflow state data indicates, for given instance of a user within the workflow campaign, which workflow campaign node of the workflow campaign the given instance of the user is at. Processing service 220 receives, from workflow database 224, workflow data corresponding to the workflow campaign node. The workflow data indicates the one or more actions associated with the workflow campaign node.

In some embodiments, determining the one or more actions associated with a workflow campaign node includes determining a type of the workflow campaign node. For example, if processing service 220 determines that a node is an entry node, then processing service 220 determines that the one or more actions include generating workflow state data associated with the user. Processing service 220 could also determine, based on workflow data associated with the workflow campaign, whether any entry rules are associated with the entry node. If one or more entry rules are associated with the entry node, then the one or more actions also include evaluating the one or more entry rules to determine whether the user should be entered into the workflow campaign. As another example, if processing service 220 determines that a node is an exit node, then processing service 220 determines that the one or more actions include generating data indicating that the user has left the workflow campaign. Additionally, processing service 220 could determine that the one or more actions include removing workflow state data corresponding to the current instance of the user within the workflow campaign from state data 226.

After determining the one or more actions associated with the node, processing service 220 performs the one or more actions and/or causes the one or more actions to be performed by another service. In some embodiments, processing service 220 determines, for each action, whether the action should be performed by the processing service 220 or by another service based on the type of action. For example, processing service 220 could be configured to perform data processing operations associated with the workflow campaign, such as generating, modifying, or deleting workflow state data, evaluating filter conditions, performing branching decisions, performing API and/or webhook calls, adding the user to another workflow campaign, and/or the like. Additionally, processing service 220 could be configured to utilize a message sending service for actions that involve sending a message to the user and/or to utilize an ingestion service for actions that involve updating a user profile associated with the user.

If processing service 220 determines that the action should be performed by processing service 220, then processing service 220 performs the action. In some embodiments, if performing a given action requires data associated with an event, then processing service 220 uses the event data included in the dequeued message. In some embodiments, if performing a given action requires user profile information, then processing service 220 queries user database 228 for user profile information associated with the user.

In some embodiments, if processing service 220 determines that another service should be utilized to perform a given action, processing service 220 transmits a request to the other service that specifies the user and the action. Additionally, the request could include any other information needed for the other service to complete the action. In some embodiments, processing service 220 generates a message that represents the action to be performed and enqueues the message in a queue associated with the other service (not shown). The queue associated with the other service could be included in queueing service 202, included elsewhere in workflow campaign system 200, or included in another system that includes the other service.

After performing the one or more actions associated with the workflow campaign node or requesting that the one or more actions be performed, processing service 220 determines whether the workflow campaign node is succeeded by another workflow campaign node in the workflow campaign. In some embodiments, processing service 220 determines whether the workflow campaign node is succeeded by another workflow campaign node based on workflow data associated with the workflow campaign. For example, the workflow data associated with the workflow campaign could indicate an order of nodes in the workflow campaign. Processing service 220 determines, based on the order of nodes, a next node in the workflow campaign, if any. If the workflow campaign node is succeeded by another workflow campaign node, then processing service 220 determines that the user should be progressed to the other workflow campaign node. In some embodiments, if the current workflow campaign is associated with a branching action, then performing the branching action includes selecting a subsequent node from a plurality of potential subsequent nodes (i.e., selecting a path from the different branches). Processing service 220 determines that the user should be progressed to the selected node.

In some embodiments, if the current workflow campaign node is associated with a filtering action, then performing the filtering action includes determining whether the user can progress to the subsequent node based on evaluating one or more filters associated with the filtering action. If processing service 220 determines that the user can progress to the subsequent node, then processing service 220 proceeds with progressing the user to the subsequent node. In some embodiments, if processing service 220 determines that the user should not progress to the subsequent node, then the processing service 220 instead performs one or more exit actions associated with the workflow campaign.

If processing service 220 determines that the user should be progressed to another workflow campaign node, then processing service 220 progresses the user to the other workflow campaign node. In some embodiments, progressing a user to a given workflow campaign node includes generating a message that associates the user with the given workflow campaign node and enqueueing the message in a queue included in queueing system 202. In some embodiments, the generated message associates the user with the workflow campaign node by including a user identifier and/or visitor identifier associated with the user and an identifier associated with the workflow campaign node. Additionally, in some embodiments, the dequeued message includes event data associated with an event that entered the user into the workflow campaign. Processing service 220 includes the event data in the generated message.

In some embodiments, enqueueing the generated message in a queue included in queueing system 202 includes identifying a particular queue that is associated with the workflow campaign and/or the subsequent workflow campaign node. In some embodiments, processing service 220 identifies the particular queue based on one or more attributes associated with the workflow campaign and/or the subsequent workflow campaign node, such as the workflow campaign identifier, the workflow campaign node identifier, a project name, an entity name, a type of action associated with the subsequent workflow campaign node, a type of node of the subsequent workflow campaign node, and/or the like. For example, if the subsequent workflow campaign node is associated with a filtering action, then processing service 220 identifies filter node queue 208 as the queue for enqueueing the generated message. Additionally, processing service 220 could identify a particular filter node queue 208 that is associated with the workflow campaign node, the workflow campaign, the project associated with the workflow campaign, and/or the entity to which the workflow campaign belongs from a plurality of filter node queues 208.

In some embodiments, processing service 220 identifies the particular queue that is associated with the workflow campaign and/or subsequent workflow campaign node based on a mapping that maps the particular queue to the subsequent workflow campaign node, the workflow campaign, the project associated with the workflow campaign, and/or the entity to which the workflow campaign belongs. In some embodiments, each queue included in queueing system 202 is associated with an identifier that follows a pre-determined naming convention. In such embodiments, instead of identifying the particular queue for enqueueing the message, processing service 220 generates a queue identifier that follows the pre-determined naming convention based on, for example, the one or more attributes associated with the workflow campaign and/or the subsequent workflow campaign node. For example, if the naming convention specifies that queue identifiers specify a workflow campaign identifier followed by an action type, then processing service 220 generates the queue identifier based on the identifier associated with the workflow campaign and the type of action associated with the subsequent workflow campaign node. Processing service 220 publishes the message to the queue having the generated queue identifier.

As illustrated in FIG. 2, processing service 220 includes a plurality of processing service workers, such as processing service workers 222(1)-222(N). Each processing service worker 222 is configured to perform any of the work described above with respect to processing service 220, such as dequeuing messages from queueing service 202, performing actions associated with the dequeued messages and/or requesting that actions associated with the dequeued message be performed, generating additional messages, and enqueueing the additional messages at queueing service 202.

In some embodiments, each processing service worker 222 is configured to receive messages from one or more corresponding queue included in queueing system 202. For example, each processing service worker 222 could be associated with one or more specific queues, one or more workflow campaigns, one or more workflow campaign nodes, one or more projects, one or more entities, and/or the like. In some embodiments, each processing service worker 222 can receive messages from any queue included in queueing system 202. The plurality of processing service workers 222 can dequeue messages from the queues included in queueing system 202 in any suitable manner, such as using a round-robin approach.

In some embodiments, the number of processing service workers 222 included in processing service 220 can be dynamically increased as the number of queues included in queueing system 202 increases and/or as the number of messages included in the queues increase. Any suitable techniques or algorithms for automatically detecting and scaling workers in a computing system can be used to dynamically increase the number of processing service workers 222.

In some embodiments, each processing service worker 222 processes messages from the queueing system 202 in a transactional manner. A transaction encapsulates a set of steps associated with processing a message. In some embodiments, a transaction starts with dequeuing a message from queueing system 202 and ends when a message associated with a next workflow campaign node is enqueued in queueing system 202, or when one or more exit actions associated with an exit node are performed. At the end of the transaction, the processing service worker 222 commits the transaction, which finalizes the action performed at each step in the transaction. However, if the processing service worker 222 fails or aborts the transaction, then any actions that were performed up until the point of failure are rolled back. For example, if a transaction includes dequeuing a message from a given queue, if the transaction fails or is aborted, then the dequeued message is re-added to the given queue. Similarly, if a transaction included transmitting a message to a given queue, then if the transaction fails or is aborted, then the message is removed from the given queue. The processing service worker 222 or a different processing service worker 222 then restarts the transaction and performs the steps included in the transaction a second time. Therefore, either all the steps included in a transaction are performed successfully, or all of the steps are rolled back and performed again.

One benefit of the above approach is that processing service 220 is able to ensure that the action(s) associated with a current node in a workflow campaign are successfully performed and that the user is successfully progressed to the next node in the workflow campaign. As a result, processing service 220 avoids the errors and data inconsistency that results when processing a message and/or enqueuing the subsequent message fails unexpectedly. For example, using typical approaches, if a message is dequeued successfully but the processing service worker 222 fails before the actions associated with the message can be completed, then because the message has already been successfully dequeued, then the actions associated with the message will fail to be performed. Additionally, the user will not be progressed to any subsequent nodes in the workflow campaign. In contrast, using a transactional approach, if a message is dequeued successfully but the processing service worker 222 fails before the actions associated with the message can be completed, then the message will be requeued and the steps of dequeuing the message and performing the actions associated with the message will be retried. Therefore, the above approach results in a higher overall reliability and consistency of the workflow campaign system 200.

In various embodiments, workflow campaign system 200 can include more or fewer elements than illustrated in FIG. 2. For example, instead of a single processing service 206 that processes both event messages and workflow campaign messages, a workflow processing system could include a first processing service that processes event messages and a second processing service that processes workflow campaign messages. As another example, workflow campaign system 200 could include a graphical user interface for managing workflow campaigns (e.g., creating or modifying a workflow campaign) and/or for viewing the state of users within a workflow campaign (e.g., the number of users at each node of the workflow campaign) and metrics associated with the workflow campaign. Additionally, as discussed above, workflow campaign system 200 can include elements that perform different actions associated with workflow campaigns.

Figure 3:
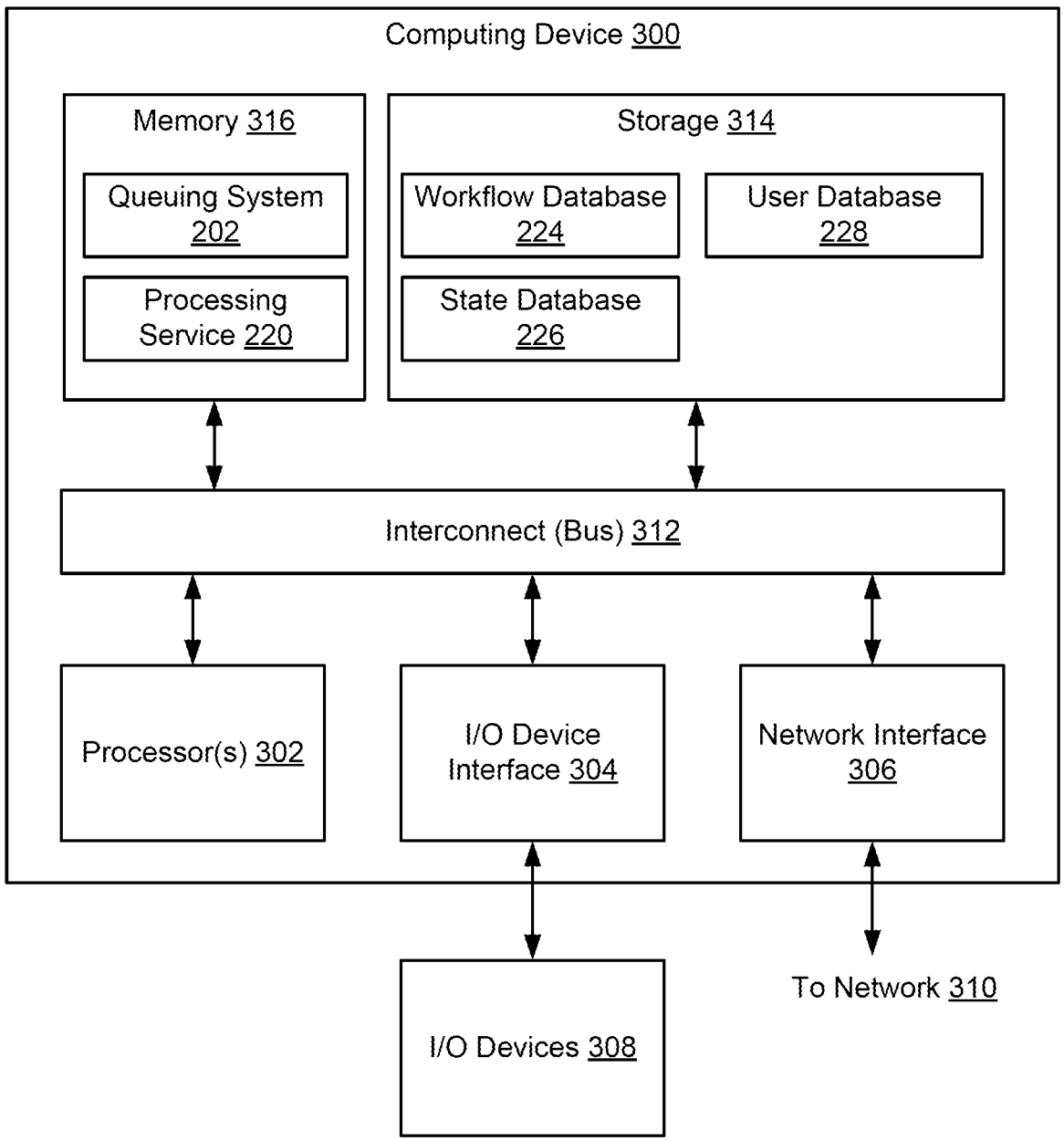
FIG. 3 is a block diagram illustrating an exemplar computing device, according to various embodiments.

FIG. 3 is a block diagram illustrating an exemplar computing device 300, according to various embodiments. As shown in FIG. 3, a computing device 300 includes, without limitation, an interconnect (bus) 312 that connects one or more processing units 302, an input/output (I/O) device interface 304 coupled to one or more input/output (I/O) devices 308, memory 316, a storage 314, and a network interface 306 connected to a network 310.

In various embodiments, computing device 300 includes a server computer, a desktop computer, a laptop computer, a smart phone, a personal digital assistant (PDA), tablet computer, or any other type of computing device configured to receive input, process data, and optionally display images, and is suitable for practicing one or more embodiments. Computing device 300 described herein is illustrative and that any other technically feasible configurations fall within the scope of the present disclosure.

Processing unit(s) 302 includes any suitable processor implemented as a central processing unit (CPU), a graphics processing unit (GPU), an application-specific integrated circuit (ASIC), a field programmable gate array (FPGA), an artificial intelligence (AI) accelerator such as a tensor processing unit (TPU), any other type of processing unit, or a combination of different processing units, such as a CPU configured to operate in conjunction with a GPU. In general, processing unit(s) 302 can be any technically feasible hardware unit capable of processing data and/or executing software applications. Further, in the context of this disclosure, the computing elements shown in computing device 300 can correspond to a physical computing system (e.g., a system in a data center) or can be included in one or more computing systems that provide a cloud computing environment or a distributed computing environment.

In some embodiments, I/O devices 308 include devices capable of providing input, such as a keyboard, a mouse, a touch-sensitive screen, and so forth, as well as devices capable of providing output, such as a display device. Additionally, I/O devices 308 can include devices capable of both receiving input and providing output, such as a touchscreen, a universal serial bus (USB) port, and so forth. I/O devices 308 can be configured to receive various types of input from an end-user of computing device 300, and to also provide various types of output to the end-user of computing device 300, such as displayed digital images or digital videos or text. In some embodiments, one or more of I/O devices 308 are configured to couple computing device 300 to a network 310.

Network 310 includes any technically feasible type of communications network that allows data to be exchanged between computing device 300 and external entities or devices, such as a web server or another networked computing device. For example, network 310 can include a wide area network (WAN), a local area network (LAN), a wireless (WiFi) network, and/or the Internet, among others.

Storage 314 includes non-volatile storage for applications and data, and may include fixed or removable disk drives, flash memory devices, and CD-ROM, DVD-ROM, Blu-Ray, HD-DVD, or other magnetic, optical, or solid-state storage devices. As shown in FIG. 3, workflow database 224, state database 226, and user database 228 are stored in storage 314. In other embodiments, workflow database 224, state database 226, and/or user database 228 are stored on one or more storage devices that are separate from computing device 300. For example, workflow database 224, state database 226, and/or user database 228 could be stored using a cloud storage system or a distributed storage system, rather than on a single storage device.

Memory 316 includes a random-access memory (RAM) module, a flash memory unit, or any other type of memory unit or combination thereof. Processing unit(s) 302, I/O device interface 304, and network interface 306 are configured to read data from and write data to memory 316. Memory 316 includes various software programs that can be executed by processing unit(s) 302 and application data associated with said software programs. As shown, memory 316 includes queueing system 202 and processing service 220 described above. In other embodiments, functionality of the queueing system 202 and/or processing service 220 can be distributed across any number of pieces of software that execute in any technically feasible manner and on any number of computing devices. For example, multiple instances of processing service 220 (i.e., the processing service workers 222) can be deployed on a number of computing devices and/or a number of virtualized environments, such as containers. As another example, the queueing system 202 and/or the processing service 220 could be implemented in a cloud computing environment or a distributed computing environment, rather than on a single computing device.

Workflow Campaign Processing

Figure 4:
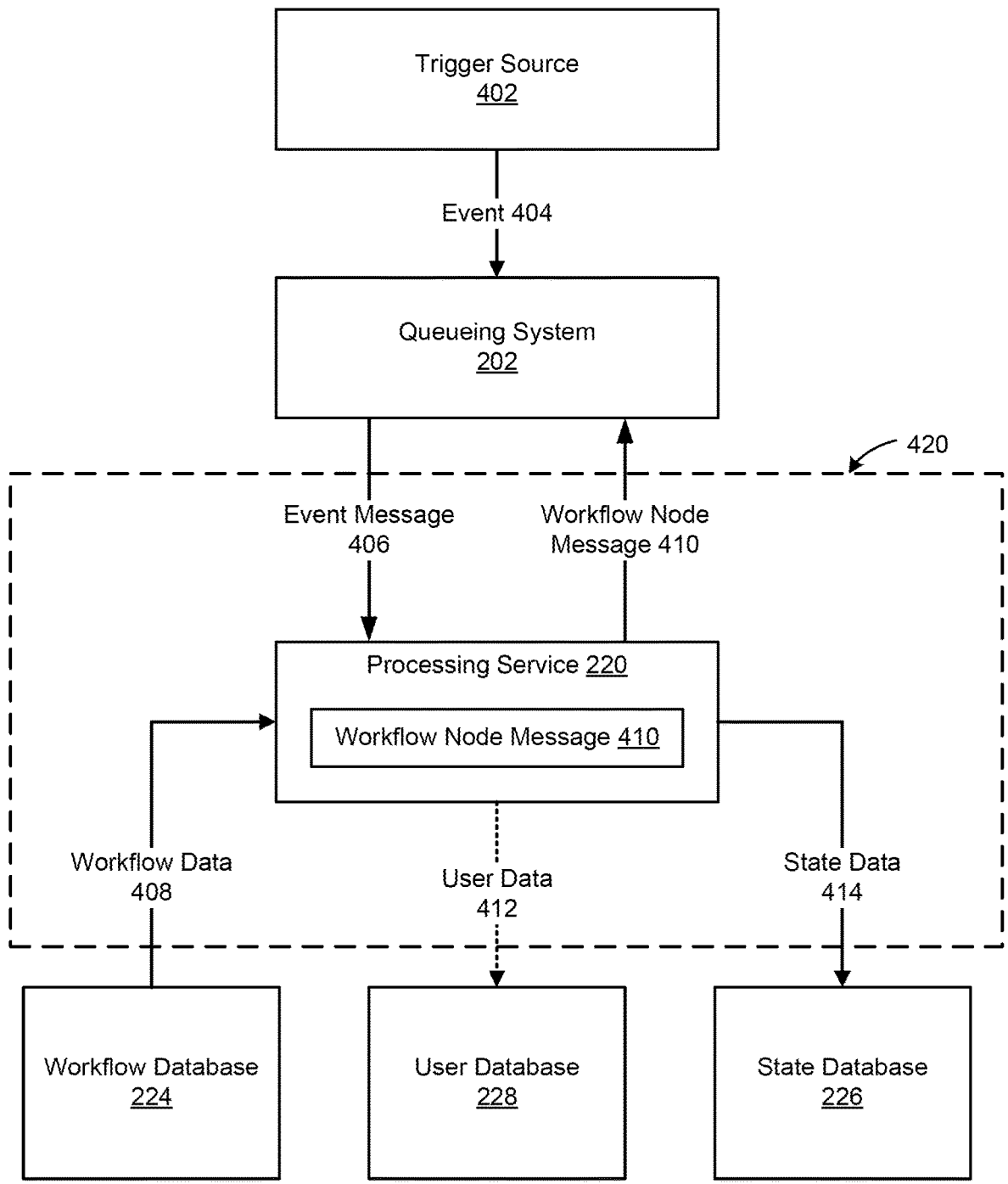
FIG. 4 illustrates an approach for processing an event to enter a user into a workflow, according to various embodiments.

FIG. 4 illustrates an approach for processing an event to enter a user into a workflow, according to various embodiments. As shown in FIG. 4, a trigger source 402 generates an event 404. Trigger source 402 can be any suitable source of events 404, for example and without limitation, another workflow campaign, an API endpoint, or other applications or services that track or monitor user actions. For example, one or more services could trigger an event in response to detecting a change in user information associated with the user and/or in response to a user action.

In response to generating the event 404, trigger source 402 generates a message corresponding to the event 404 and transmits the message to an event queue 204 included in queueing system 202. The message specifies information associated with the event 404, such as the trigger source 402, an event type of the event 404, a user associated with the event 404, a payload associated with the event 404, and/or the like. Upon receiving the message corresponding to the event 404, queueing system 202 enqueues the message in the event queue 204.

Subsequently, when the message corresponding to event 404 reaches the front of the event queue 204, processing service 220, or a processing service worker 222 included in processing service 220, dequeues an event message 406 corresponding to the event 404 from the event queue 204. Processing service 220 processes the event message 406 to determine a workflow campaign that is triggered by the event 404. As shown in FIG. 4, processing service 220 receives workflow data 408 from workflow database 224. Workflow data 408 includes data indicating the trigger(s) for different workflow campaigns. Processing service 220 determines which workflow campaign is triggered by the event 404 based on the workflow data 408 and the information associated with the event 404 that is included in event message 406.

Processing service 220 generates a workflow node message 410 associated with the triggered workflow campaign. Processing service 220 generates the workflow node message 410 based on the information included in event message 406 and the workflow data 408 corresponding to the triggered workflow campaign. The workflow node message 410 specifies information associated with the triggered workflow campaign, such as the trigger source 402, the event type of the event 404, the payload associated with the event 404, the user associated with the event 404, a visitor identifier associated with the user entering the triggered workflow campaign, a workflow campaign identifier associated with the triggered workflow campaign, a node identifier associated with the entry node of the triggered workflow campaign, and/or the like.

Processing service 220 transmits the workflow node message 410 to an entry node queue 206 included in the queueing system 202. Upon receiving workflow node message 410, queueing system 202 enqueues the workflow node message 410 in the entry node queue 206. After the workflow node message 410 is successfully enqueued in the entry node queue 206, the user associated with event 404 is considered to be entered into the workflow campaign.

If processing service 220 determines that multiple workflow campaigns are triggered by the event 404, then processing service 220 generates, for each triggered workflow campaign, a corresponding workflow node message 410. Processing service 220 transmits each workflow node message 410 to a corresponding entry node queue 206 included in queueing system 202.

Processing service 220 updates state database 226 with state data 414. The state data 414 includes workflow state data associated with the entry of the user into the workflow campaign, such as the user identifier, visitor identifier, workflow campaign identifier, and the entry node identifier. The state data 414 is added to the state database 226.

Optionally, processing service 220 updates user database 228 with user data 412. The user data 412 includes data associated with the event 404, such as the trigger source 402, the event type, and the payload of the event 404. The user profile information associated with the user is updated to include the user data 412. In some embodiments, processing service 220 transmits the user data 412 to an ingestion service that updates the user database 228.

In some embodiments, processing an event message 406 is performed in a transactional manner. FIG. 4 illustrates a transaction boundary 420 that indicates the actions included in a single transaction. As shown, dequeuing event message 406, generating workflow node message 410, enqueuing workflow node message 410, adding user data 412 to user database 228, and adding state data 414 to state database 226 are included within the transaction boundary 420. If the transaction fails or is aborted, then any of the work performed during the transaction, e.g., dequeuing event message 406, generating workflow node message 410, enqueuing workflow node message 410, adding user data 412 to user database 228, and/or adding state data 414 to state database 226, are rolled back. After processing service 220 successfully performs each of the actions included within transaction boundary 420, processing service 220 commits the transaction.

Figure 5:
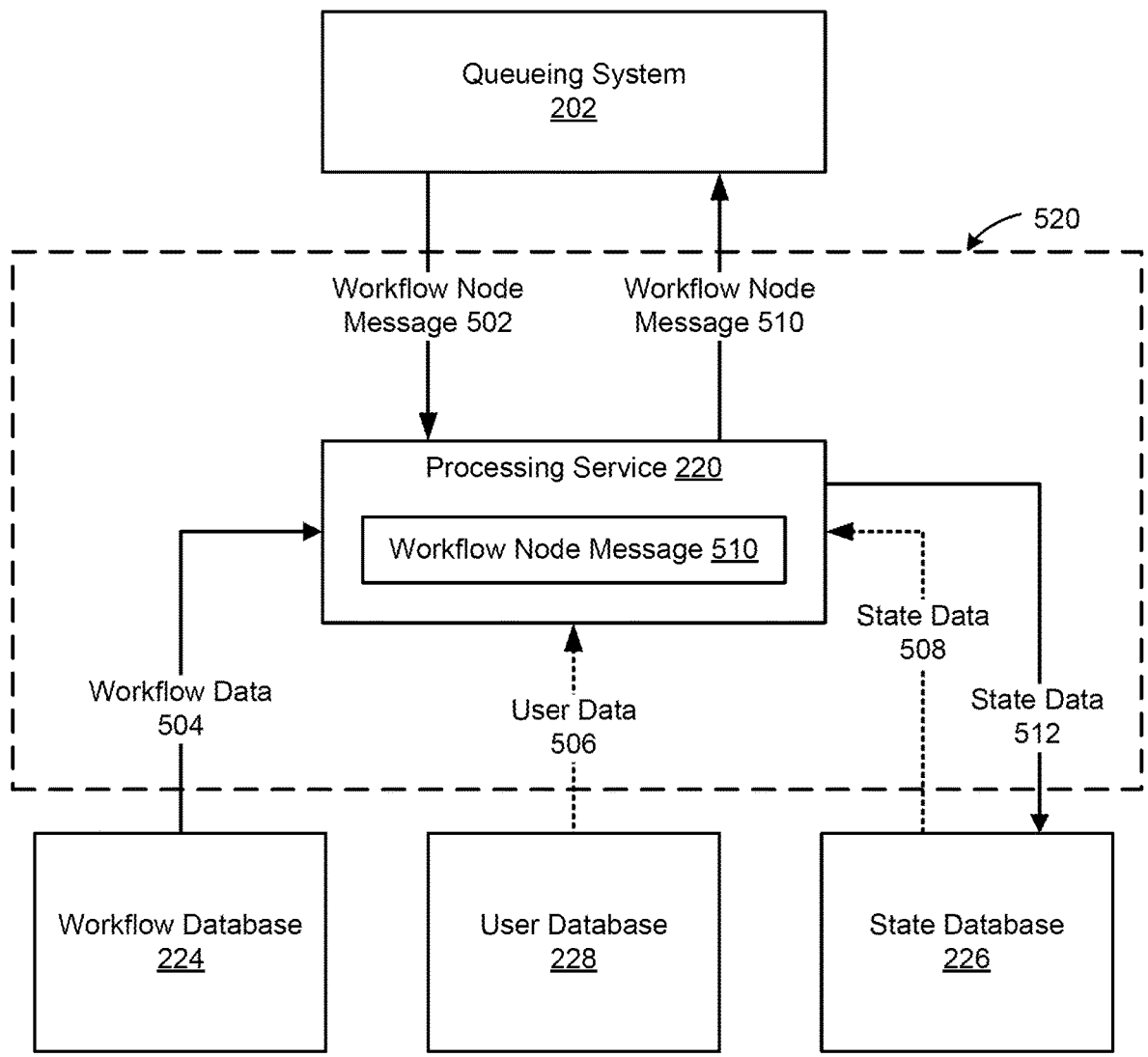
FIG. 5 illustrates an approach for processing a workflow node message to progress a user through a workflow, according to various embodiments.

FIG. 5 illustrates an approach for processing a workflow node message to progress a user through a workflow, according to various embodiments. As shown in FIG. 5, processing service 220, or a processing service worker 222 included in processing service 220, dequeues a workflow node message 502 from queueing system 202. The workflow node message 502 corresponds to an arrival of a user at a workflow campaign node of a workflow campaign. The workflow node message 502 specifies information associated with the arrival of the user at the workflow campaign node, such as a user identifier associated with the user, a visitor identifier associated with the current instance of the user, a workflow campaign identifier associated with the workflow campaign, a node identifier associated with the workflow campaign node, event information associated with an event that triggered entry of the user into the workflow campaign, and/or the like.

Processing service 220 processes the workflow node message 502 to determine one or more actions associated with the workflow campaign node to be performed with respect to the user. As shown in FIG. 5, processing service 220 receives workflow data 504 from workflow database 224. Workflow data 504 includes data that defines one or more actions associated with the workflow campaign node and specifies any rules or parameters associated with each action. Processing service 220 determines, based on the workflow data 504, what actions to be performed and, for each action, the rules and parameters associated with the action.

For each action, if processing service 220 is configured to perform the action, then processing service 220 performs the action. Optionally, performing an action includes querying user database 228 and/or state database 226 for data associated with the user. As shown in FIG. 5, processing service 220 receives user data 506 and state data 508 associated with the user. User data 506 includes user profile information associated with the user. Similarly, state data 508 includes workflow state information associated with the user. The workflow state information could include workflow state information for other instances of the user within the workflow campaign or could include only workflow state information for the current instance of the user. The specific information included in user data 506 and state data 508 can vary depending on the action being performed. For example, if an action specifies a criteria that is based on a given user profile field, then user data 506 could include only the data value(s) included in the given user profile field for the user. As another example, if an action includes determining whether any other instances of the user are in the workflow campaign, the state data 508 could include a query result that indicates whether workflow state data associated with other instances of the user was found in state database 226 and/or the number of instances that were found in state database 226.

If processing service 220 is not configured to perform the action, then processing service 220 identifies the service that is configured to perform the action and transmits a request to perform the action to the identified service. In some embodiments, processing service 220 generates a message corresponding to the request to perform the action and transmits the message to a queue associated with the identified service. At a subsequent time, the service dequeues the message and performs the requested action. The generated message specifies information associated with the action, such as the specific action, the user for which the action is to be performed, rules associated with the action, parameters associated with the action, and/or the like. For example, a message for sending a message to a user could specify the user identifier, the communication channel for sending the message, contact information for the user that is associated with the communication channel (e.g., a phone number or email address), the contents of the message to be sent to the user, and/or the like. As another example, a message for updating user profile information for a user could specify the user identifier, one or more fields being updated, data values for each field being updated, and/or the like.

After processing the workflow node message 502, processing service 220 determines whether the user should progress to another workflow campaign node in the workflow campaign. If the current workflow campaign node is an exit node, then processing service 220 determines that the user is exiting the workflow campaign. If the current workflow campaign node is a filter node, then processing service 220 determines, based on applying the filter associated with the current workflow campaign node, whether the user should progress to the next workflow campaign node. If processing service 220 determines that the user is exiting the workflow campaign, the processing service 220 performs one or more exit actions associated with the workflow campaign. In some embodiments, processing service 220 determines the one or more exit actions by querying workflow database 224 and receiving workflow data 504 that indicates the one or more exit actions.

If processing service 220 determines that the user should progress to the next workflow campaign node, processing service 220 identifies the next workflow campaign node. Processing service 220 queries workflow database 224 and receives workflow data 504 that indicates one or more workflow campaign nodes that are immediately subsequent to the current workflow campaign node, if any. If workflow data 504 indicates that a single workflow campaign node is immediately subsequent to the current workflow campaign node, the processing service 220 determines that the user should progress to the indicated workflow campaign node. If workflow data 504 indicates that multiple workflow campaign nodes are immediately subsequent to the current workflow campaign node (e.g., the current workflow campaign node is a branching node), then processing service 220 determines the particular workflow campaign node based on performing the branching action associated with the current workflow campaign node. Processing service 220 determines that the user should progress to the particular workflow campaign node.

After determining that the user should progress from the current workflow campaign node to the identified workflow campaign node, processing service 220 generates a workflow node message 510 corresponding to an arrival of the user at the identified workflow campaign node. Processing service 220 generates the workflow node message 510 based on the information included in workflow node message 510 and the workflow data 504 corresponding to the identified workflow campaign node. The workflow node message 510 specifies information associated with the arrival of the user at the identified workflow campaign node, such as the user identifier associated with the user, the visitor identifier associated with the current instance of the user, the workflow campaign identifier associated with the workflow campaign, a node identifier associated with the identified workflow campaign node, the event information associated with an event that triggered entry of the user into the workflow campaign, and/or the like.

Processing service 220 determines a queue included in queueing system 202 that is associated with the identified workflow campaign node and transmits the workflow node message 510 to the queue. Upon receiving workflow node message 510, queueing system 202 enqueues the workflow node message 510 in the associated queue. After the workflow node message 510 is successfully enqueued in the associated queue, the user is considered to be progressed from the workflow campaign node associated with workflow node message 502 to the identified workflow campaign node.

Processing service 220 updates state database 226 with state data 512. The state data 512 includes workflow state data associated with the arrival of the user at the identified workflow campaign node, such as the user identifier, visitor identifier, workflow campaign identifier, and the identifier of the workflow campaign node. The state data 512 is added to the state database 226. If workflow state data associated with a current instance of the user in the workflow campaign is already included in state database 226, the workflow state data is updated based on state data 512.

In some embodiments, processing a workflow node message 502 is performed in a transactional manner. FIG. 5 illustrates a transaction boundary 520 that indicates the actions included in a single transaction. As shown, dequeuing workflow node message 502, performing the one or more actions associated with the workflow node message 502, generating workflow node message 510, enqueuing workflow node message 510, and adding state data 512 to state database 228 are included within the transaction boundary 520. If the transaction fails or is aborted, then any of the work performed during the transaction, e.g., dequeuing workflow node message 502, performing the one or more actions associated with the workflow node message 502, generating workflow node message 510, enqueuing workflow node message 510, and/or adding state data 512 to state database 228, are rolled back. After processing service 220 successfully performs each of the actions included within transaction boundary 520, processing service 220 commits the transaction.

Figure 6:
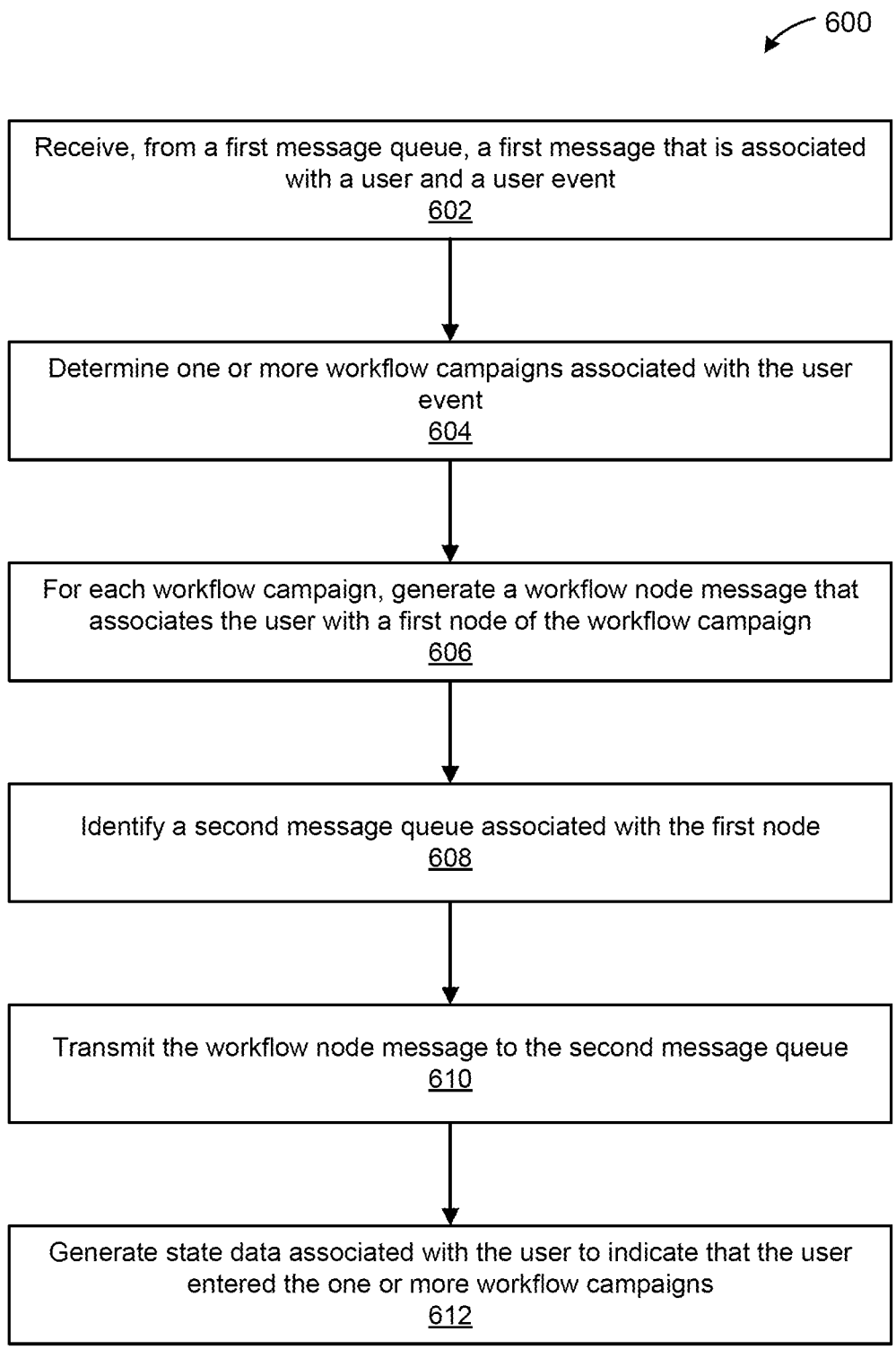
FIG. 6 is a flow diagram of method steps for processing an event message to enter a user into one or more workflows, according to various embodiments.

FIG. 6 is a flow diagram of method steps for processing an event message to enter a user into one or more workflows, according to various embodiments. Although the method steps are described in conjunction with the systems of FIGS. 1-5, persons of ordinary skill in the art will understand that any system configured to perform the method steps, in any order, is within the scope of the present disclosure. In some embodiments, method steps 602-612 are performed in a single transaction by a processing service (e.g., processing service 220).

As shown in FIG. 6, a method 600 begins at step 602, where a processing service 220 receives, from a first message queue, a first message that is associated with a user and a user event. The message specifies information associated with the user event, such as a source of the user event, a type of the user event, an identifier associated with the user, a payload associated with the user event, and/or the like.

At step 604, the processing service 220 determines one or more workflow campaigns associated with the user event. Determining the one or more workflow campaigns associated with the user event is performed in a manner similar to that discussed above with respect to processing service 220 and event message 406.

In some embodiments, determining the one or more workflow campaigns is based on the information specified in the first message. For example, source of the user event, the type of user event, and/or the payload associated with the user event could be compared to the method(s) of entry for each workflow campaign to determine which workflow campaigns are triggered by the user event. In some embodiments, processing service 220 queries a workflow database 224 and receives workflow data indicating the one or more workflow campaigns.

In some embodiments, determining the one or more workflow campaigns is based on the first message queue from which the first message was dequeued. If the first message queue is associated with a given workflow campaign, then processing service 220 determines that the given workflow campaign is associated with the user event. If the first message queue is associated with a given workflow campaign attribute, such as a project, tag, label, owner, and/or the like, then processing service 220 determines that one or more workflow campaigns that are associated with the given workflow campaign attribute are associated with the user event.

At step 606, the processing service 220 generates, for each workflow campaign of the one or more workflow campaigns, a workflow node message that associates the user with a first workflow campaign node of the workflow campaign. The workflow node message for a given workflow campaign specifies information associated with the given workflow campaign, such as the source of the user event, type of user, the payload associated with the user, the user identifier of the user, the workflow campaign identifier of the workflow campaign, the node identifier of the entry node of the workflow campaign, and/or the like.

In some embodiments, the workflow node message for each workflow campaign specifies a visitor identifier that associates the user with an entry into the workflow campaign that is triggered by the user event. Processing service 220 generates a visitor identifier associated with the user, user event, and workflow campaign, and includes the visitor identifier in the workflow node message.

At step 608, the processing service 220 identifies, for each workflow campaign, a second message queue that is associated with the first workflow campaign node of the workflow campaign. Identifying a message queue that is associated with a workflow campaign node is performed in a manner similar to that discussed above with respect to processing service 220, queueing system 202, and workflow node message 410.

In some embodiments, identifying the message queue that is associated with the first workflow campaign node includes identifying an entry node queue 206 included in queueing service 202. If queueing service 202 includes a plurality of entry node queues 206, then processing service 220 determines a specific entry node queue 206 that is associated with the first workflow campaign node. In some embodiments, processing service 220 determines the specific entry node queue 206 based on a mapping that maps the specific entry node queue 206 to the workflow campaign and/or to the first workflow campaign node. In some embodiments, the queues included in queueing system 202 are associated with identifiers that follow a pre-determined naming convention. Processing service 220 identifies the message queue by generating a message queue identifier that follows the pre-determined naming convention based on the workflow campaign, the first workflow campaign node, and/or attributes associated with the workflow campaign and the first workflow campaign node.

At step 610, the processing service 220 transmits, for each workflow campaign, the workflow node message to the second message queue. In some embodiments, transmitting the workflow node message to the second message queue includes publishing the message to the second message queue. In some embodiments, transmitting the workflow node message to the second message queue includes transmitting a request to the queueing system 202 to enqueue the workflow node message in the second message queue. Queueing system 202 receives the request and stores the workflow node message in the second message queue.

At step 612, the processing service 220 generates workflow state data associated with the user to indicate that the user entered the one or more workflow campaigns. The workflow state data includes, for each workflow campaign, workflow state data that is associated with the entry of the user into the workflow campaign such as the user identifier, visitor identifier, workflow campaign identifier, and the entry node identifier. After generating the workflow state data, processing service 220 transmits the workflow state data to a state database 226. The workflow state data is stored in the state database 226.

Figure 7:
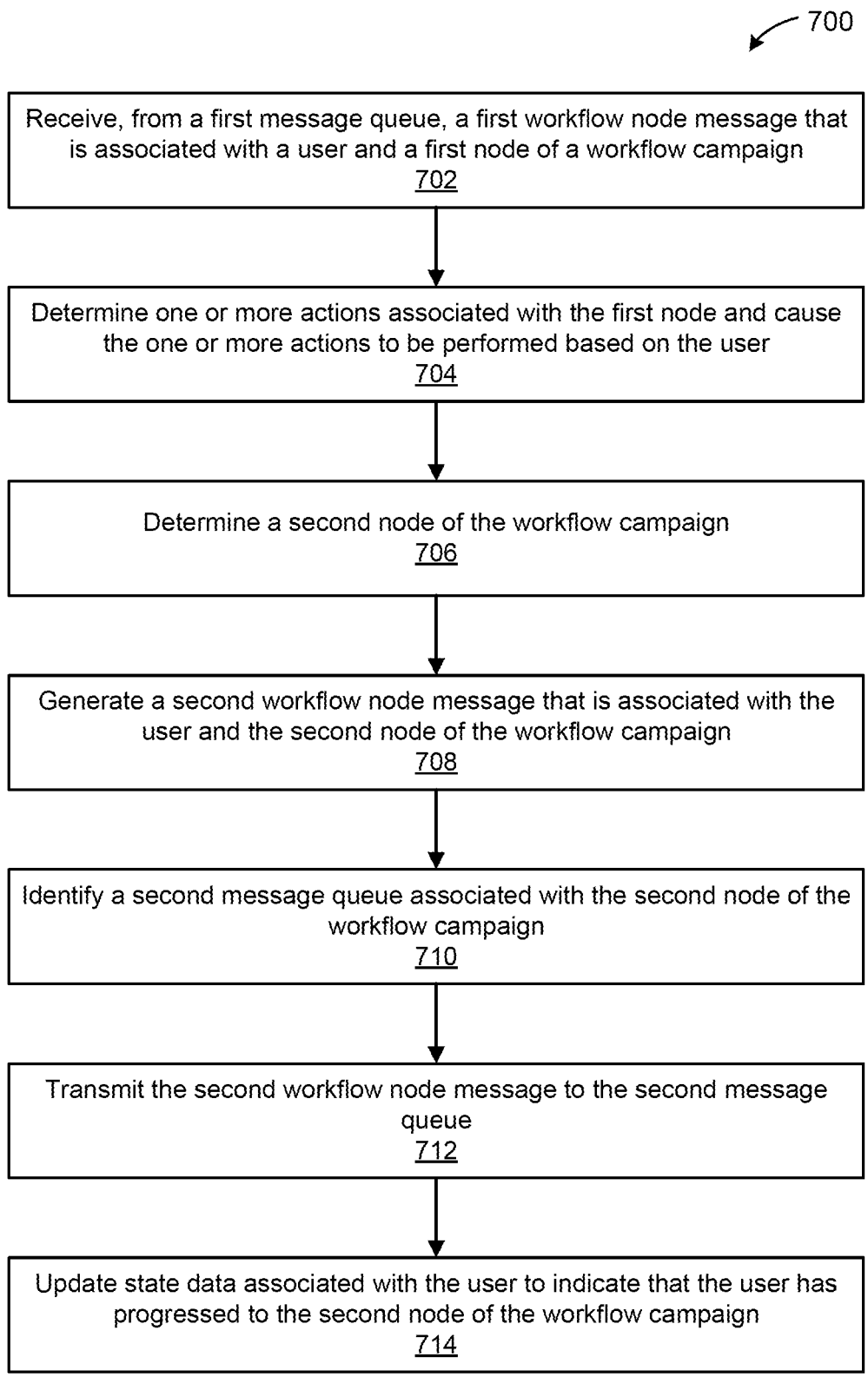
FIG. 7 is a flow diagram of method steps for processing a workflow node message to progress a user through a workflow, according to various embodiments.

FIG. 7 is a flow diagram of method steps for processing a workflow node message to progress a user through a workflow, according to various embodiments. Although the method steps are described in conjunction with the systems of FIGS. 1-5, persons of ordinary skill in the art will understand that any system configured to perform the method steps, in any order, is within the scope of the present disclosure. In some embodiments, method steps 702-714 are performed in a single transaction by a processing service (e.g., processing service 220).

As shown in FIG. 7, a method 700 begins at step 702, where a processing service 220 receives, from a first message queue, a first workflow node message that is associated with a user and a first node of a workflow campaign. The first workflow node message corresponds to the user arriving at the first node of the workflow campaign. The message specifies information associated with the arrival of the user at the first node, such as a user identifier associated with the user, a visitor identifier associated with the current instance of the user, a workflow campaign identifier associated with the workflow campaign, a node identifier associated with the first node, event information associated with an event that triggered entry of the user into the workflow campaign, and/or the like.

At step 704, the processing service 220 determines one or more actions associated with the first node and cause the one or more actions to be performed based on the user. Determining the one or more actions and causing the one or more actions to be performed is performed in a manner similar to that discussed above with respect to processing service 220 and workflow node message 502.

In some embodiments, determining the one or more actions associated with the first node is based on the information specified in the first workflow node message. For example, the workflow campaign identifier and/or the node identifier could be used to retrieve or query workflow database 224 for workflow data associated with the first node. The workflow data defines one or more actions associated with the first node, as well as any rules and/or parameters associated with each action.

For each action, processing service 220 determines whether the action should be performed by processing service 220, by another element of workflow campaign system 200, or by another system. If processing service 220 determines that a given action should be performed by processing service 220, the processing service 220 performs the given action. If processing service 220 determines that the action should be performed by another element of workflow campaign system 200 or by another system, then processing service 220 transmits a request to the other element or other system to perform the action.

At step 706, the processing service 220 determines a second node of the workflow campaign. Determining a second node of the workflow campaign is performed in a manner similar to that discussed above with respect to processing service 220 and workflow node messages 502 and 510.

Processing service 220 queries workflow database 224 and receives workflow data that indicates one or more workflow campaign nodes that are immediately subsequent to the first node, if any. If the workflow data indicates that a single workflow campaign node is immediately subsequent to the first node, then processing service 220 determines that the second node is the indicated workflow campaign node. If the workflow data indicates that multiple workflow campaign nodes are immediately subsequent to the first node, then processing service 220 determines the second node based on performing the one or more actions associated with the first node, such as evaluating filters or conditions for selecting a subsequent node.

At step 708, the processing service 220 generates a second workflow node message that is associated with the user and the second node of the workflow campaign. The workflow node message specifies information associated with the arrival of the user at the second node, such as such as the user identifier associated with the user, the visitor identifier associated with the current instance of the user, the workflow campaign identifier associated with the workflow campaign, a node identifier associated with the second node, event information associated with an event that triggered entry of the user into the workflow campaign, and/or the like.

At step 710, the processing service 220 identifies a second message queue that is associated with the second node of the workflow campaign. Identifying a message queue that is associated with a workflow campaign node is performed in a manner similar to that discussed above with respect to processing service 220, queueing system 202, and workflow node message 510.

In some embodiments, identifying the second message queue includes determining a workflow node type of the second node and identifying a message queue that is associated with the workflow node type. If queueing service 202 includes a plurality of queues associated with the workflow node type, then processing service 220 determines a specific queue that is associated with the second node. In some embodiments, processing service 220 determines the specific queue based on a mapping that maps a specific queue to the workflow campaign and/or to the second node. In some embodiments, the queues included in queueing system 202 are associated with identifiers that follow a pre-determined naming convention. Processing service 220 identifies the message queue by generating a message queue identifier that follows the pre-determined naming convention based on the workflow campaign, the second node, and/or attributes associated with the workflow campaign and the second node.

At step 712, the processing service 220 transmits the second workflow node message to the second message queue. In some embodiments, transmitting the second workflow node message to the second message queue includes publishing the second workflow node message to the second message queue. In some embodiments, transmitting the second workflow node message to the second message queue includes transmitting a request to the queueing system 202 to enqueue the second workflow node message in the second message queue. Queueing system 202 receives the request and stores the second workflow node message in the second message queue.

At step 714, the processing service 220 updates workflow state data associated with the user to indicate that the user has progressed to the second node of the workflow campaign. The workflow state data associated with the user includes the user identifier, the visitor identifier, the workflow campaign identifier, and an identifier of a current node within the workflow campaign that the user is at. Processing service 220 updates the identifier of the current node to the identifier of the second node.

In sum, a workflow campaign system is configured to process users within a workflow campaign using a plurality of message queues. When a user event occurs, the user event is added to a message queue. The user event is subsequently processed to determine which workflow campaigns a user associated with the user event should be entered into. The workflow campaign system enters the user into a workflow campaign by generating a message that corresponds to the arrival of the user at an entry node of the workflow campaign, and adding the message to a message queue associated with the entry node.

To progress a user through a workflow campaign, the message corresponding to the arrival of the user at a node of the workflow campaign is dequeued from a message queue associated with the node. One or more workflow campaign actions associated with the node are performed for the user based on the contents of the dequeued message. After the one or more workflow campaign actions associated with the node have been performed, workflow campaign system progresses the user to the next node in the workflow campaign by generating a message that corresponds to the arrival of the user at the next node of the workflow campaign, and adding the message to a message queue associated with the next node. In this manner, the workflow campaign system progresses the user through each step of a workflow campaign until the user reaches the end of the workflow campaign.

One technical advantage of the disclosed techniques relative to the prior art is that the disclosed techniques enable workflow campaign data to be processed with higher throughput and more consistency on a larger scale. In particular, because users within a workflow campaign are processed as messages in a message queue, a workflow processing system can utilize separate message queues to isolate workflow campaigns and/or workflow campaign steps that require longer processing times. Further, by processing messages in a transactional manner, the workflow processing system is able to perform an action for a current step in a workflow campaign and schedule an immediately subsequent step in the workflow campaign correctly for each user associated with the workflow campaign. As a result, the workflow processing system is able to maintain a high processing throughput for different users while ensuring that the state of all processed data remains consistent throughout different parts of the workflow processing system. These technical advantages represent one or more technological improvements over prior art approaches.

1. In some embodiments, a computer-implemented method for processing a workflow campaign comprises receiving, from a first message queue that is associated with a first node of a workflow campaign, a first message that corresponds to a first user arriving at the first node of the workflow campaign; causing one or more actions associated with the first node of the workflow campaign to be performed with respect to the first user based on the first message; determining that the first user should be progressed from the first node of the workflow campaign to a second node of the workflow campaign; in response to determining that the first user should be progressed from the first node of the workflow campaign to the second node of the workflow campaign, generating a second message that corresponds to the first user arriving at the second node of the workflow campaign; determining a second message queue that is associated with the second node of the workflow campaign; and transmitting the second message to the second message queue to progress the first user from the first node of the workflow campaign to the second node of the workflow campaign.

2. The computer-implemented method of clause 1, the method further comprising updating workflow state data associated with the first user to indicate that the first user has progressed from the first node of the workflow campaign to the second node of the workflow campaign.

3. The computer-implemented method of clause 1 or clause 2, wherein causing the one or more actions to be performed comprises receiving workflow data associated with the workflow campaign, and determining the one or more actions associated with the first node of the workflow campaign based on the workflow data.

4. The computer-implemented method of any of clauses 1-3, wherein the second message queue is determined to be associated with the second node of the workflow campaign based on a node type of the second node.

5. The computer-implemented method of any of clauses 1-4, wherein the second message queue is determined to be associated with the second node of the workflow campaign based on the workflow campaign.

6. The computer-implemented method of any of clauses 1-5, wherein receiving the first message from the first message queue and transmitting the second message to the second message queue are performed as part of a first transaction.

7. The computer-implemented method of any of clauses 1-6, further comprising, in response to determining that the first transaction has failed, causing the first message to be returned to the first message queue.

8. The computer-implemented method of any of clauses 1-7, further comprising, in response to determining that the first transaction has failed, causing the second message to be removed from the first message queue.

9. The computer-implemented method of any of clauses 1-8, further comprising: receiving, from a third message queue, a third message that corresponds to an event associated with a second user; determining that the second user should be entered into the workflow campaign based on the event associated with the second user; in response to determining that the second user should be entered into the workflow campaign, generating a fourth message that corresponds to the second user arriving at an entry node of the workflow campaign; determining a fourth message queue that is associated with the entry node of the workflow campaign; and transmitting the fourth message to the fourth message queue to enter the second user into the workflow campaign.

10. The computer-implemented method of any of clauses 1-9, further comprising, evaluating one or more entry rules associated with the workflow campaign to determine whether a second user should be entered into the workflow campaign.

11. In some embodiments, one or more non-transitory computer-readable media store instructions that, when executed by one or more processors, cause the one or more processors to perform the steps of receiving, from a first message queue that is associated with a first node of a workflow campaign, a first message that corresponds to a first user arriving at the first node of the workflow campaign; causing one or more actions associated with the first node of the workflow campaign to be performed with respect to the first user based on the first message; determining that the first user should be progressed from the first node of the workflow campaign to a second node of the workflow campaign; in response to determining that the first user should be progressed from the first node of the workflow campaign to the second node of the workflow campaign, generating a second message that corresponds to the first user arriving at the second node of the workflow campaign; determining a second message queue that is associated with the second node of the workflow campaign; and transmitting the second message to the second message queue to progress the first user from the first node of the workflow campaign to the second node of the workflow campaign.

12. The one or more non-transitory computer-readable media of clause 11, further comprising, updating workflow state data associated with the first user to indicate that the first user has progressed from the first node of the workflow campaign to the second node of the workflow campaign.

13. The one or more non-transitory computer-readable media of clause 11 or clause 12, wherein the one or more actions comprise evaluating one or more filters, and determining that the first user should be progressed to the second node is based on evaluating the one or more filters.

14. The one or more non-transitory computer-readable media of any of clauses 11-13, wherein the one or more actions comprise selecting a first path from a plurality of paths in the workflow campaign, and determining that the first user should be progressed to the second node is based on selecting the first path.

15. The one or more non-transitory computer-readable media of any of clauses 11-14, wherein determining that the first user should be progressed to the second node comprises receiving workflow data associated with the workflow campaign, and determining that the second node immediately follows the first node in the workflow campaign.

16. The one or more non-transitory computer-readable media of any of clauses 11-15, wherein receiving the first message from the first message queue and transmitting the second message to the second message queue are performed as part of a first transaction.

17. The one or more non-transitory computer-readable media of any of clauses 11-16, further comprising, in response to determining that the first transaction has failed, causing the first message to be returned to the first message queue.

18. The one or more non-transitory computer-readable media of any of clauses 11-17, further comprising, in response to determining that the first transaction has failed, causing the second message to be removed from the first message queue.

19. The one or more non-transitory computer-readable media of any of clauses 11-18, further comprising: receiving, from a third message queue, a third message that corresponds to an event associated with a second user; determining that the second user should be entered into the workflow campaign based on the event associated with the second user; in response to determining that the second user should be entered into the workflow campaign, generating a fourth message that corresponds to the second user arriving at an entry node of the workflow campaign; determining a fourth message queue that is associated with the entry node of the workflow campaign; and transmitting the fourth message to the fourth message queue to enter the second user into the workflow campaign.

20. In some embodiments, a system comprises one or more memories storing instructions, and one or more processors that are coupled to the one or more memories and, when executing the instructions, are configured to receive, from a first message queue that is associated with a first node of a workflow campaign, a first message that corresponds to a first user arriving at the first node of the workflow campaign; cause one or more actions associated with the first node of the workflow campaign to be performed with respect to the first user based on the first message; determine that the first user should be progressed from the first node of the workflow campaign to a second node of the workflow campaign; in response to determining that the first user should be progressed from the first node of the workflow campaign to the second node of the workflow campaign, generate a second message that corresponds to the first user arriving at the second node of the workflow campaign; determine a second message queue that is associated with the second node of the workflow campaign; and transmit the second message to the second message queue to progress the first user from the first node of the workflow campaign to the second node of the workflow campaign.

Any and all combinations of any of the claim elements recited in any of the claims and/or any elements described in this application, in any fashion, fall within the contemplated scope of the present invention and protection.

The descriptions of the various embodiments have been presented for purposes of illustration, but are not intended to be exhaustive or limited to the embodiments disclosed.

Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "module," a "system," or a "computer." In addition, any hardware and/or software technique, process, function, component, engine, module, or system described in the present disclosure may be implemented as a circuit or set of circuits. Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine. The instructions, when executed via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable gate arrays.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A computer-implemented method for processing a workflow campaign, the method comprising:
   receiving, from a first message queue that is associated with a first node of a workflow campaign, a first message that corresponds to a first user arriving at the first node of the workflow campaign;
   causing one or more actions associated with the first node of the workflow campaign to be performed with respect to the first user based on the first message;
   determining that the first user should be progressed from the first node of the workflow campaign to a second node of the workflow campaign;
   in response to determining that the first user should be progressed from the first node of the workflow campaign to the second node of the workflow campaign, generating a second message that corresponds to the first user arriving at the second node of the workflow campaign;
   determining a second message queue that is associated with the second node of the workflow campaign; and
   transmitting the second message to the second message queue to progress the first user from the first node of the workflow campaign to the second node of the workflow campaign.

2. The computer-implemented method of claim 1, the method further comprising updating workflow state data associated with the first user to indicate that the first user has progressed from the first node of the workflow campaign to the second node of the workflow campaign.

3. The computer-implemented method of claim 1, wherein causing the one or more actions to be performed comprises receiving workflow data associated with the workflow campaign, and determining the one or more actions associated with the first node of the workflow campaign based on the workflow data.

4. The computer-implemented method of claim 1, wherein the second message queue is determined to be associated with the second node of the workflow campaign based on a node type of the second node.

5. The computer-implemented method of claim 1, wherein the second message queue is determined to be associated with the second node of the workflow campaign based on the workflow campaign.

6. The computer-implemented method of claim 1, wherein receiving the first message from the first message queue and transmitting the second message to the second message queue are performed as part of a first transaction.

7. The computer-implemented method of claim 6, further comprising, in response to determining that the first transaction has failed, causing the first message to be returned to the first message queue.

8. The computer-implemented method of claim 6, further comprising, in response to determining that the first transaction has failed, causing the second message to be removed from the first second message queue.

9. The computer-implemented method of claim 1, further comprising:
receiving, from a third message queue, a third message that corresponds to an event associated with a second user;
determining that the second user should be entered into the workflow campaign based on the event associated with the second user;
in response to determining that the second user should be entered into the workflow campaign, generating a fourth message that corresponds to the second user arriving at an entry node of the workflow campaign;
determining a fourth message queue that is associated with the entry node of the workflow campaign; and
transmitting the fourth message to the fourth message queue to enter the second user into the workflow campaign.

10. The computer-implemented method of claim 1, further comprising, evaluating one or more entry rules associated with the workflow campaign to determine whether a second user should be entered into the workflow campaign.

11. One or more non-transitory computer-readable media storing instructions that, when executed by one or more processors, cause the one or more processors to perform the steps of:
receiving, from a first message queue that is associated with a first node of a workflow campaign, a first message that corresponds to a first user arriving at the first node of the workflow campaign;
causing one or more actions associated with the first node of the workflow campaign to be performed with respect to the first user based on the first message;
determining that the first user should be progressed from the first node of the workflow campaign to a second node of the workflow campaign;
in response to determining that the first user should be progressed from the first node of the workflow campaign to the second node of the workflow campaign, generating a second message that corresponds to the first user arriving at the second node of the workflow campaign;
determining a second message queue that is associated with the second node of the workflow campaign; and
transmitting the second message to the second message queue to progress the first user from the first node of the workflow campaign to the second node of the workflow campaign.

12. The one or more non-transitory computer-readable media of claim 11, further comprising, updating workflow state data associated with the first user to indicate that the first user has progressed from the first node of the workflow campaign to the second node of the workflow campaign.

13. The one or more non-transitory computer-readable media of claim 11, wherein the one or more actions comprise evaluating one or more filters, and determining that the first user should be progressed to the second node is based on evaluating the one or more filters.

14. The one or more non-transitory computer-readable media of claim 11, wherein the one or more actions comprise selecting a first path from a plurality of paths in the workflow campaign, and determining that the first user should be progressed to the second node is based on selecting the first path.

15. The one or more non-transitory computer-readable media of claim 11, wherein determining that the first user should be progressed to the second node comprises receiving workflow data associated with the workflow campaign, and determining that the second node immediately follows the first node in the workflow campaign.

16. The one or more non-transitory computer-readable media of claim 11, wherein receiving the first message from the first message queue and transmitting the second message to the second message queue are performed as part of a first transaction.

17. The one or more non-transitory computer-readable media of claim 16, further comprising, in response to determining that the first transaction has failed, causing the first message to be returned to the first message queue.

18. The one or more non-transitory computer-readable media of claim 16, further comprising, in response to determining that the first transaction has failed, causing the second message to be removed from the second message queue.

19. The one or more non-transitory computer-readable media of claim 11, further comprising:
receiving, from a third message queue, a third message that corresponds to an event associated with a second user;
determining that the second user should be entered into the workflow campaign based on the event associated with the second user;
in response to determining that the second user should be entered into the workflow campaign, generating a fourth message that corresponds to the second user arriving at an entry node of the workflow campaign;
determining a fourth message queue that is associated with the entry node of the workflow campaign; and
transmitting the fourth message to the fourth message queue to enter the second user into the workflow campaign.

20. A system comprising:
one or more memories storing instructions, and
one or more processors that are coupled to the one or more memories and, when executing the instructions, are configured to:
receive, from a first message queue that is associated with a first node of a workflow campaign, a first message that corresponds to a first user arriving at the first node of the workflow campaign;
cause one or more actions associated with the first node of the workflow campaign to be performed with respect to the first user based on the first message;
determine that the first user should be progressed from the first node of the workflow campaign to a second node of the workflow campaign;
in response to determining that the first user should be progressed from the first node of the workflow campaign to the second node of the workflow campaign, generate a second message that corresponds to the first user arriving at the second node of the workflow campaign;
determine a second message queue that is associated with the second node of the workflow campaign; and transmit the second message to the second message queue to progress the first user from the first node of the workflow campaign to the second node of the workflow campaign.

\* \* \* \* \*

UNITED STATES PATENT AND TRADEMARK OFFICE
CERTIFICATE OF CORRECTION

| | | |
|---|---|---|
| PATENT NO. | : 12,468,583 B2 | Page 1 of 1 |
| APPLICATION NO. | : 17/840520 | |
| DATED | : November 11, 2025 | |
| INVENTOR(S) | : Gregory Michael Methvin et al. | |

It is certified that error appears in the above-identified patent and that said Letters Patent is hereby corrected as shown below:

In the Claims

In Column 33, Line 8, in Claim 8, delete "first second" and insert -- second --.

Signed and Sealed this
Third Day of February, 2026

John A. Squires
*Director of the United States Patent and Trademark Office*